(12) United States Patent  (10) Patent No.: US 7,780,001 B2
Seko  (45) Date of Patent: Aug. 24, 2010

(54) FILE WRAPPER FOR WRAPPING

(75) Inventor: Akiyoshi Seko, Tokyo (JP)

(73) Assignee: Dainichi Printing Co., Ltd., Tokyo (JP)

( * ) Notice: Subject to any disclaimer, the term of this patent is extended or adjusted under 35 U.S.C. 154(b) by 760 days.

(21) Appl. No.: 11/192,463

(22) Filed: Jul. 26, 2005

(65) Prior Publication Data

US 2006/0108404 A1 May 25, 2006

(30) Foreign Application Priority Data

Nov. 11, 2004 (JP) ............................. 2004-327141

(51) Int. Cl.
  *B65D 85/57* (2006.01)
(52) U.S. Cl. .................................. 206/312; 206/308.1
(58) Field of Classification Search .............. 206/308.1, 206/312, 784, 313, 309; 229/82, 84
  See application file for complete search history.

(56) References Cited

U.S. PATENT DOCUMENTS

| | | | | | |
|---|---|---|---|---|---|
| 2,437,934 | A | * | 3/1948 | Brink | 229/84 |
| 4,971,195 | A | * | 11/1990 | Mitsuyama | 206/308.1 |
| 5,279,456 | A | * | 1/1994 | Bernstein | 229/87.08 |
| 5,638,953 | A | * | 6/1997 | House | 206/308.1 |
| D387,976 | S | * | 12/1997 | Mori | D6/634 |
| 5,725,093 | A | * | 3/1998 | Yamaguchi et al. | 206/308.1 |
| 5,749,463 | A | * | 5/1998 | Collins | 206/308.1 |
| D417,974 | S | * | 12/1999 | Mori | D6/407 |
| 6,227,364 | B1 | * | 5/2001 | Collins | 206/312 |
| 6,298,985 | B1 | * | 10/2001 | Mathias | 206/308.1 |
| 6,905,019 | B2 | * | 6/2005 | Lacomis | 206/312 |
| 2006/0283729 | A1 | * | 12/2006 | Feffer | 206/232 |

FOREIGN PATENT DOCUMENTS

JP  2004-035113  2/2004

* cited by examiner

*Primary Examiner*—Mickey Yu
*Assistant Examiner*—Sharon M Prange
(74) *Attorney, Agent, or Firm*—Jordan and Hamburg LLP

(57) ABSTRACT

A file wrapper for wrapping is provided. The file wrapper for wrapping comprises a file wrapper for wrapping comprising: a the cutting body, which comprises a unit piece of a covering paper and a backing paper of integral constitution that is bent to form a bag shape, sealing pieces provided to the covering paper and the backing paper, at the opening portion of the bag shape for inserting commodities, respectively, and side sticking pieces provided to the both sides portion of the covering paper. The one sealing piece is provided with a stopper of commodities after inserting them, and the other sealing piece is provided with the connecting piece inserted in the notch hole of the stopper and engaged thereto.

1 Claim, 22 Drawing Sheets

RELATED ART

RELATED ART

RELATED ART

FILE WRAPPER FOR WRAPPING

BACKGROUND OF THE INVENTION

The present invention relates to a file wrapper for wrapping of commodities, for example, film shaped and plate shaped photograph, file picture, postcard, band-aid, or, thin sheet shaped stationeries, commodity of teaching materials, and advertising handbill, or pamphlets, furthermore, sample, or foods for service, for example, tea, chocolate, chewing gum, other laminated foods, and a file wrapper for wrapping capable of interfiling these commodities in necessary documents of magazines.

Hitherto, in transporting or in selling and in carrying a CD-ROM, a wrapping shaped CD casing, in which a CD-ROM is stored as well as protected, has been used.

For example, as shown in FIGS. 22 and 23 an envelope 100 with window for CD label, in which a main body 102 of the envelope is produced with a kraft paper and a window portion 104 is formed by pasting a glassine film 113 to a circular window 106 opened in a front paper plate 103, has been put to practical use. (Refer to Japanese Patent Application Opened No. 35,113/2004).

Moreover, a CD case of a boxed carton system formed by pasting two places of the cardboard, has been put to practical use.

Also, a number of cases, in which CD-ROM is interfiled, have increasingly been used in magazines, where the casings are made of plastic such as the vinyl or polypropylenes.

Moreover, instead of the plastic casing, as shown in FIGS. 24 and 25, a casing 130 is formed with a paper material in the shape of bag and a CD109 is inserted the casing 130, and a pressure sensitive adhesive double coated tape 133 is pasted to a back surface 132 of the casing 130 thereby developing a file wrapper for wrapping which is so constituted that the CD case is pasted to the required file page of the magazine through the pressure sensitive adhesive double sided tape 133.

On the other hand, CD casings 134, 140 of the constitution that has a bound-in width portion to bind it with the bind-in portion of the magazine, and shown in FIGS. 24-27, have been used.

A CD casing 134 shown in FIGS. 26 and 27, has a shape of bag shaped (envelope) casing, a bound-in width 135 is provided in a protruding condition at the side of an opening portion 136 in which a CD109 is inserted, after the CD109 is inserted from the opening portion 136, and after sealing the opening portion 136 with a sealing member 137, the bound-in width 135 is bound to the binding portion of the magazine, under the condition that the opening portion 136 is sealed by the sealing member 137.

Moreover, in FIG. 27, numeral 139 shows the side piece of the casing.

Next, a CD casing 140 shown in FIGS. 28 and 29 consists of a carton system (box where two places of the corrugated paper were pasted) casing. The CD casing 140 is provided with a bound-in width 141 in a protruding condition at the side of an opening portion 146, after the CD 109 is inserted through the opening portion 146, the bound-in width 141 is bound to the bind-in portion of the magazine, under the condition that the opening portion 146 is sealed by a sealing member 147.

Moreover, the box typed portion of the CD casing 140 folds back an interfolding portion 143 of a corrugated cardboard mount 142, leaves the opening portion 146, and is glued on other side portions 144, 145 at two places, thereby forming the box typed CD casing portion.

In addition, instead of the bound-in CD casing of FIGS. 24-29, the applicant proposes a bound-in CD casing shown in FIG. 30. (Refer to Japanese Patent Application No. 298,103/2004).

That is, a bound-in CD casing 200 is provided with bound-in widths 203 and 204 of a covering paper 207 and a backing paper 208 of the CD casing 200, respectively, at the side of opening portion 223 for CD charging, and the bound-in width 204 is formed shorter than the bound-in width 203, and the bound-in width 204 is provided with a CD sealing piece 205.

After inserting the CD109 in the conventionally used CD casing 100, it is sealed with a pressure sensitive adhesive double coated tape 107 that is pasted beforehand on the back side of a lid piece 105 provided to the opening portion in which the CD109 of the CD casing 100 is inserted. After inserting the CD109 in the CD casing 100, before sealing the CD casing 100 on the lid piece 105, and after peeling off the tape on the surface side of the pressure sensitive adhesive double coated tape 107, the lid piece 105 is overlapped on the back 108 of the CD casing 100, while turning the lid piece 105 back, and then the pasting pressure sensitive adhesive double coated tape 107 is pasted on the back 108, thereby performing the sealing.

However, in the method of sealing the CD casing 100 of this constitution, comparing with the point that the CD casing 100 itself is cheap, in addition to the cost of materials of pressure sensitive adhesive double coated tape 107, a step of pasting the tape to the lid piece 105, working process in which release paper of pressure sensitive adhesive double coated tape 107 is peeled off, and this is pasted, and operation cost are added to the price, so that the disadvantage that the sealing cost rises more than the price of the CD casing 100 itself, is caused.

Moreover, the CD casing of the above carton system lacks further working property and economical efficiency more than CD casing 100 of the bag forming system, too.

In addition thereto, in the case of the above bound-in CD casing, when the CD casing of the plastic resin system is interfiled in the magazine, an improper problem is caused in case of reproducing the magazine as an used paper.

Moreover, by the same token, even in case of FIGS. 22 and 23, the pressure sensitive adhesive double coated tape 133 corresponds to contraindication goods B in the provision of the used paper recycling association, so that the use of the pressure sensitive adhesive double coated tape should be avoided.

Moreover, the work and the pay of pasting itself the pressure sensitive adhesive double coated tape 133 are needed, and thus there is a disadvantage that the price rises, too.

In addition, even in the case of CD casings 134, 140 of the bag forming system and the carton system in FIGS. 24-27, work and pay of pasting the sealing members 137, 147 by which the opening portions 136, 146 for inserting the CD 109 therein are sealed, are demanded, and the sealing members 137, 147 become a disadvantage at the time of reproducing the used paper, so that the disadvantage is caused in the viewpoint of economical efficiency from the load given to the environment, the cost of materials, work, and pay.

Moreover, in the file wrapper for wrapping of carton system shown in FIGS. 26 and 27, side portions 144, 145 in two places are glued on in order to form a boxed casing as the inserting portion of the CD 109, but, the paste itself used thereto has an environmental problem.

In the case of the bound-in CD casing 200 shown in FIG. 28, the disadvantage of the above CD casings 100, 134, 140 can be solved. Moreover, though the CD 109 can be fixed by the sealing piece 205, the fixing of the CD 109 due to only the sealing piece 205 might cause deviation in placement, by the impact or the like during the step of inserting the CD 109 or the transportation step after insertion of the CD 109.

SUMMARY OF THE INVENTION

The present invention is developed by considering the above conventional disadvantage in the wrapping of the above conventional CD casing, bound-in CD casing, and furthermore, tabular commodities other than CD and similar commodities thereto, and has for its object to provide a file wrapper for wrapping, in which the inserted CD can be adequately fixed, the impact on to the environment is decreased, the structure is made simple, and the economical efficiency is abundant.

In order to achieve the above object, according to the present invention, there is a file wrapper for wrapping comprising: a die cutting body, which comprises a unit piece of a covering paper and a backing paper of integral constitution that is bent to form a bag shape, sealing pieces provided to the covering paper and the backing paper, at the opening portion of the bag shape for inserting commodities, respectively, and side sticking pieces provided to the both sides portion of the covering paper, the one sealing piece being provided with a stopper of commodities after inserting them, and the other sealing piece is provided with the connecting piece inserted in the notch hole of the stopper and engaged thereto.

Moreover, in the preferable embodiment of the present invention, the connecting piece is formed longer than the widths of the notch hole of the stopper somewhat.

The stopper is formed with a sectorial stopper, and the connecting piece is constituted with a rectangular connecting piece comprising a width of some rather shorts from length in the base of the notch hole of the sectorial stopper, and an engaging portion with the notch hole of the sectorial stopper.

The sealing pieces for the covering paper and the backing paper make the covering paper and the backing paper easy to separate, and facilitates the insertion of commodities, by making the length of either one sealing piece of the covering paper and the backing paper being shorter than the length of the other sealing piece.

A see-through window for commodities to be inserted is provided to either one of the covering paper or the backing paper.

According to the present invention, there is a file wrapper for wrapping comprising: a die cutting body, which comprises a unit piece of a covering paper and a backing paper of integral constitution that is bent to form a bag shape, sealing pieces provided to the covering paper and the backing paper, at the opening portion of the bag shape for inserting commodities, respectively, and side sticking pieces provided to the both sides portion of the covering paper, the one sealing piece being provided with a stopper of commodities after inserting them, the other sealing piece is provided with the connecting piece inserted in the notch hole of the stopper and engaged thereto, and bound-in width portions to the document of the magazines being provided to the sealing pieces for the covering paper and the backing paper.

According to the present invention, there is a file wrapper for wrapping comprising: a die cutting body, which comprises a unit piece of a covering paper and a backing paper of integral constitution that is bent to form a bag shape, sealing pieces provided to the covering paper and the backing paper, at the opening portion of the bag shape for inserting commodities, respectively, and side sticking pieces provided to the both sides portion of the covering paper, the one sealing piece being provided with a stopper of commodities after inserting them, the other sealing piece is provided with the connecting piece inserted in the notch hole of the stopper and engaged thereto, bound-in width portions to the document of the magazines being provided to the sealing pieces for the covering paper and the backing paper, and a perforated line for the cutout being engraved to the sealing pieces.

According to the present invention, an above connecting piece is formed longer than the widths of the notch hole of the stopper somewhat.

The stopper is formed with a sectorial stopper, and the connecting piece is constituted with a rectangular connecting piece comprising a width of some rather shorts from length in the base of the notch hole of the sectorial stopper, and an engaging portion with the notch hole of the sectorial stopper.

The sealing pieces for the covering paper and the backing paper make the covering paper and the backing paper easy to separate, and facilitates the insertion of commodities, by making the length of either one sealing piece of the covering paper and the backing paper being shorter than the length of the other sealing piece.

According to the present invention, in the file wrapper for wrapping commodities, the opening portion side for inserting the commodities is provided with the sealing pieces for the covering paper and the backing paper or the bound-in width portion provided on the sealing pieces, the one sealing piece is provided with the stopper for commodities, and the other sealing piece is provided with the connecting piece inserted in the notch hole of the stopper and engaged thereto, so that this has both the fixing means of the commodities and the sealing means of the file wrapper for wrapping at the same time, the deviation and the dashing out of the commodities in the commodity insertion work process and the commodities transportation step are prevented, the load given to the environment is decreased, the file wrapper for wrapping with simple structure and excellent economical efficiency, and the file wrapper for wrapping capable of being interfiled to the document of the magazine or the like, can be provided.

DETAILED DESCRIPTION OF THE INVENTION

While the specification concludes with claims particularly pointing out and distinctly claiming the subject-matter of the invention, it is believed the invention will be better understood from the following description taken in connection with the accompanying drawings.

Hereafter, the embodiments of the present invention are explained in detail with reference to the drawings.

First Embodiment

Figure 1:
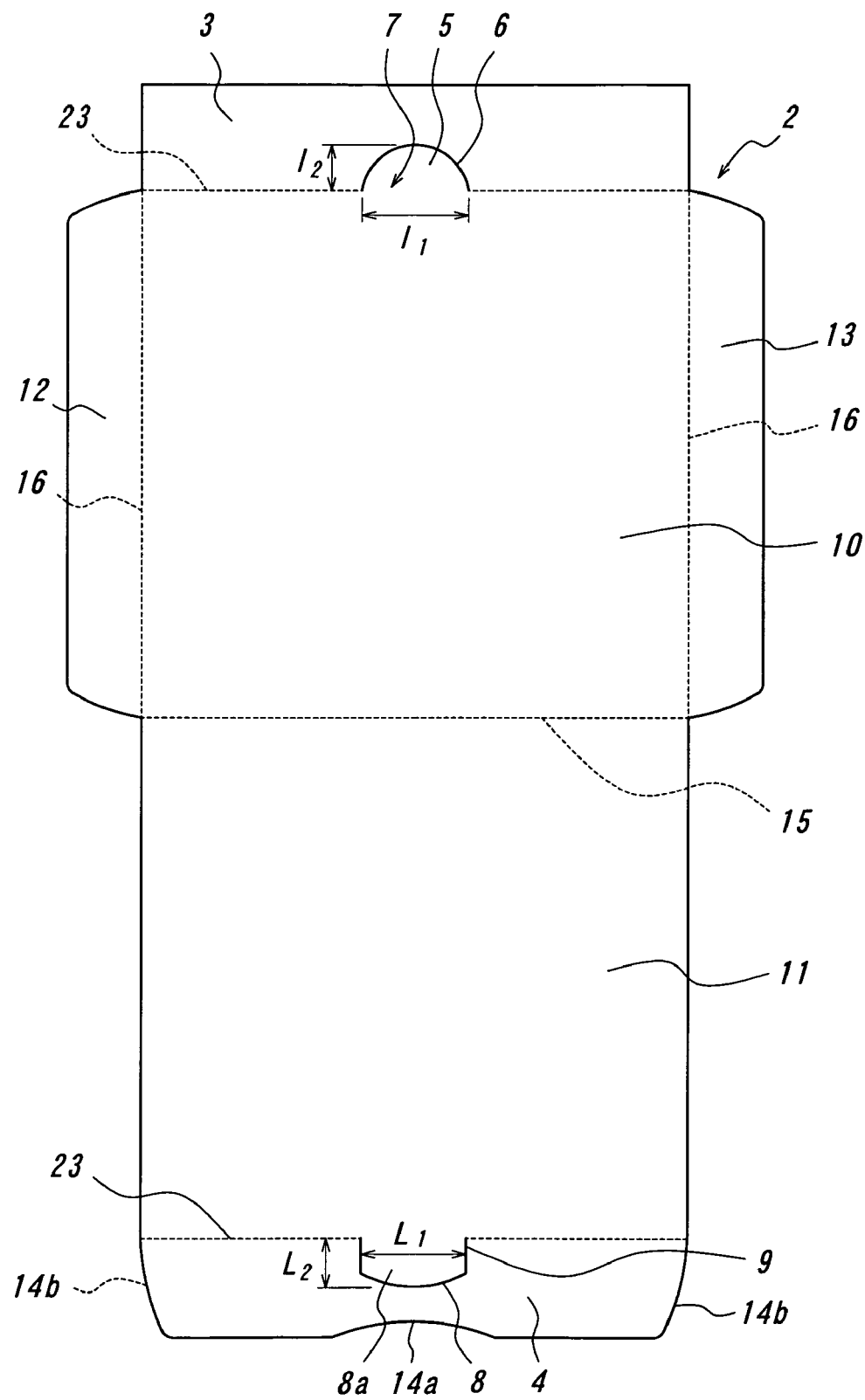
FIG. 1 is a development view of a file wrapper for wrapping showing an embodiment 1 according to the present invention.
Figure 2:
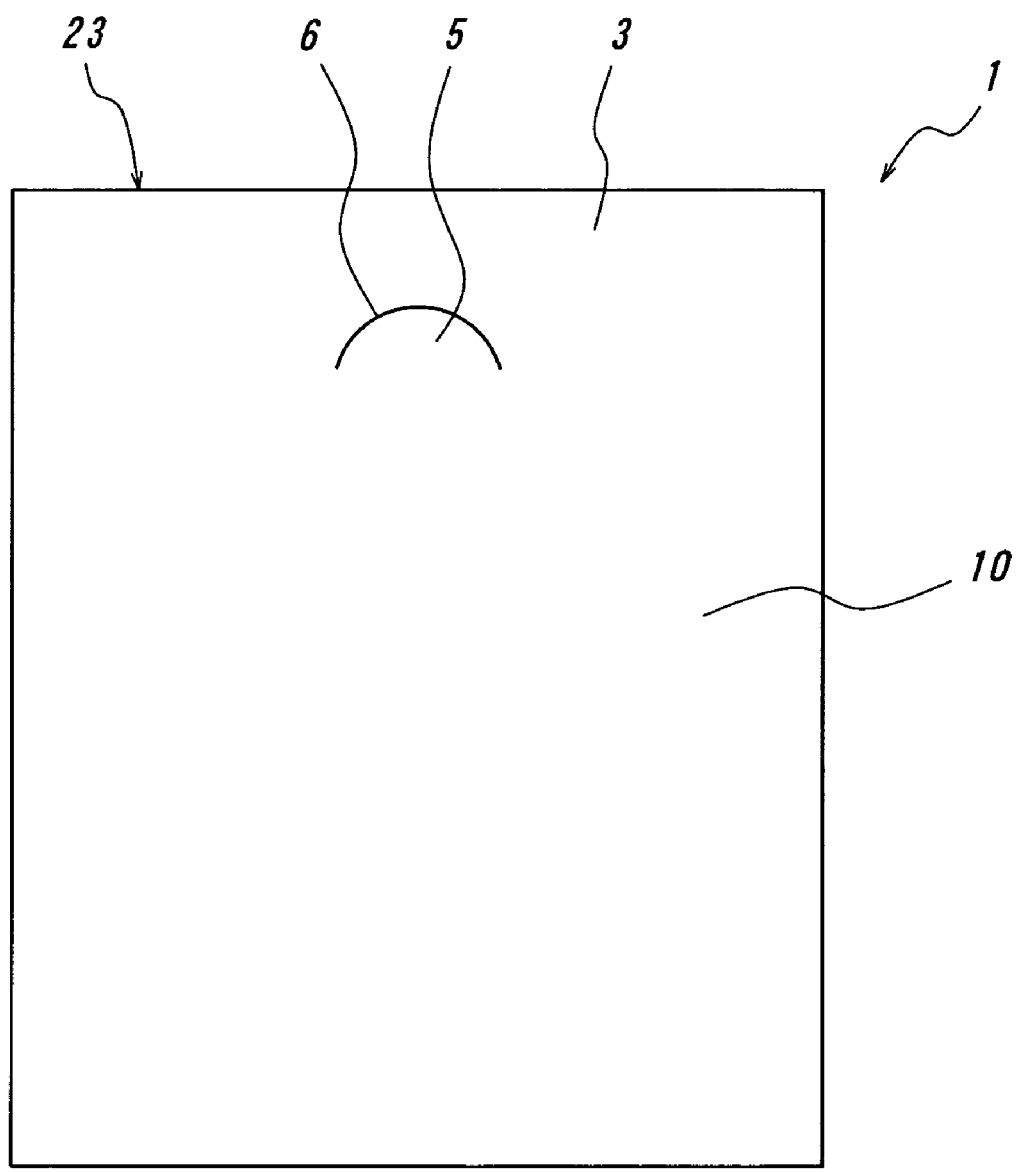
FIG. 2 is a surface view of the file wrapper for wrapping showing the embodiment 1 according to the present invention.
Figure 3:
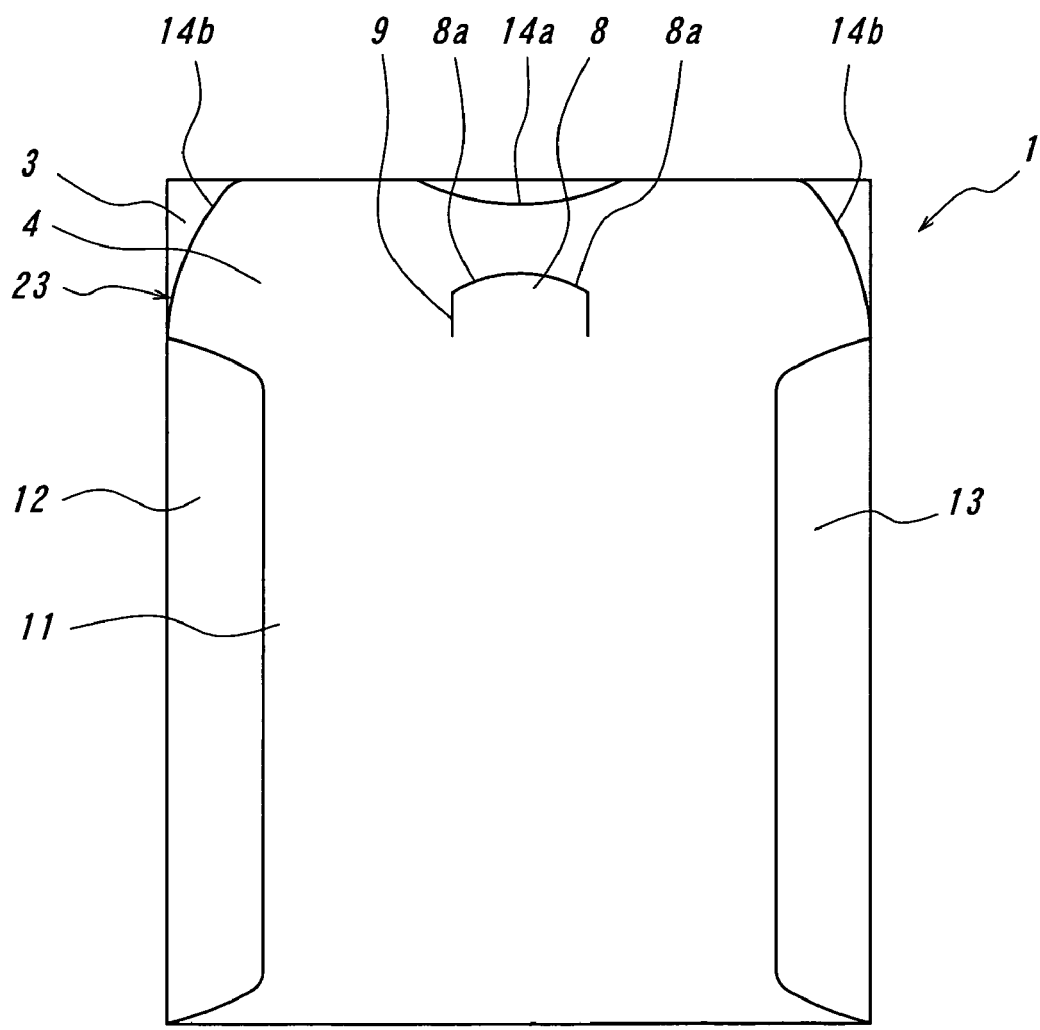
FIG. 3 is a back side back view of the file wrapper for wrapping showing the embodiment 1 according to the present invention.
Figure 4:
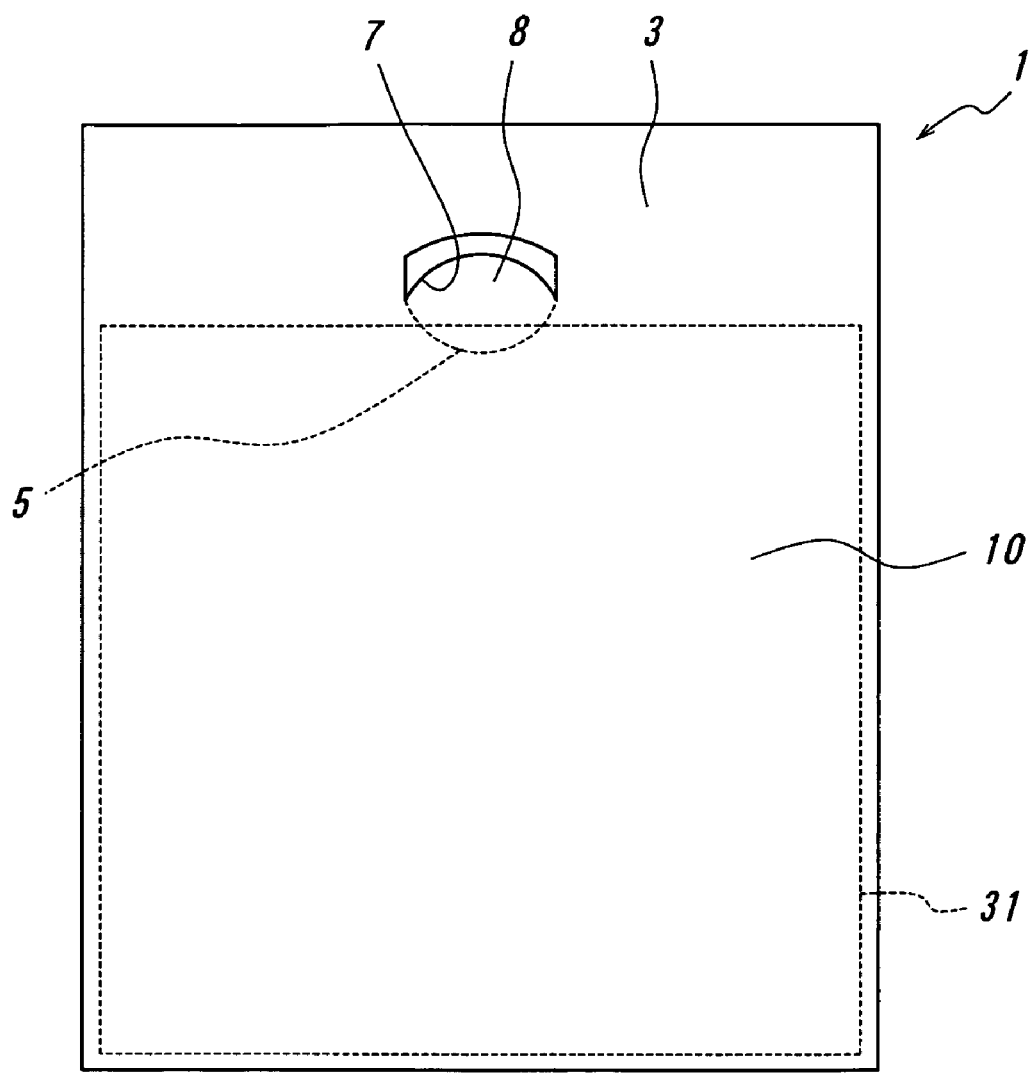
FIG. 4 is a surface view of the file wrapper for wrapping showing state of wrapping the file wrapper for wrapping in the embodiment 1 according to the present invention.
Figure 5:
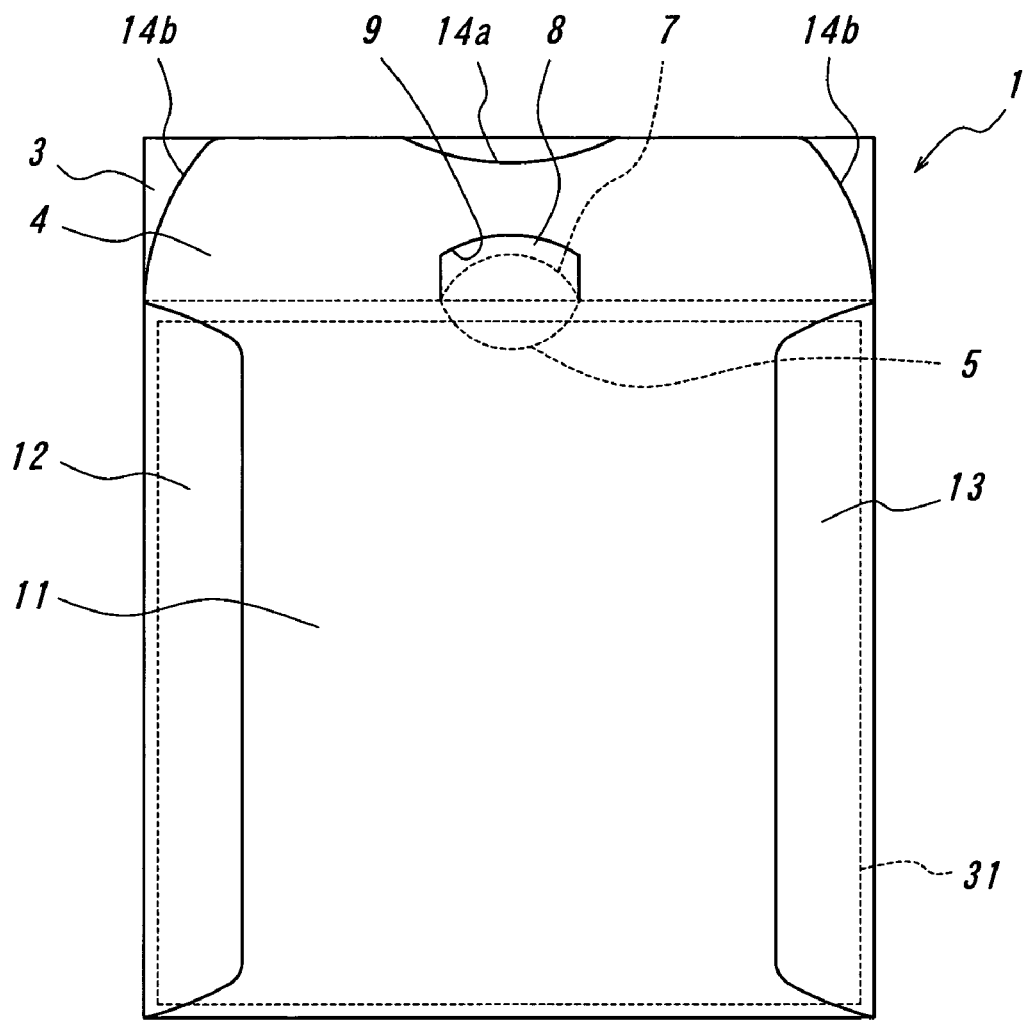
FIG. 5 is a back side back view of file wrapper for wrapping showing state of wrapping the file wrapper for wrapping in the embodiment 1 according to the present invention.
Figure 6:
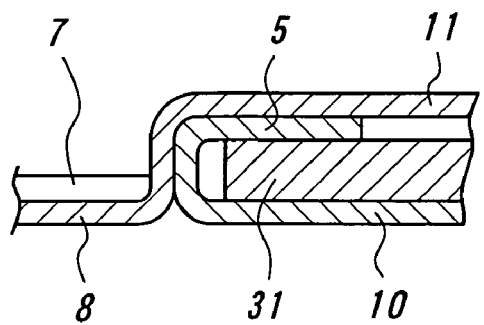
FIG. 6 is an enlarged sectional view showing the state of latching together and sealing commodities or the like by a stopper and connecting piece of the embodiment 1 according to the present invention.
Figure 7:
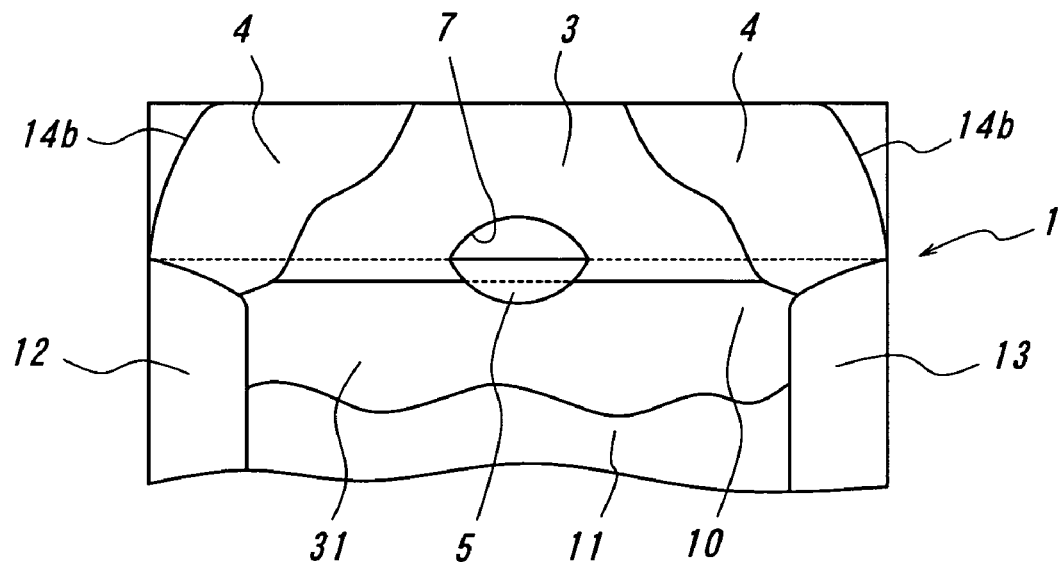
FIG. 7 is an explanatory view showing the state of latching together commodities or the like by a stopper of the embodiment 1 according to the present invention.
Figure 8:
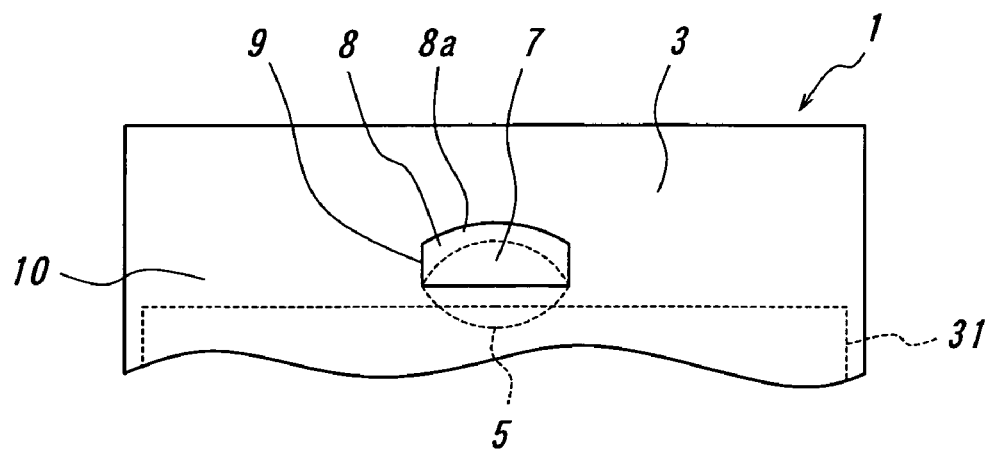
FIG. 8 is an explanatory view showing the state of sealing with the connected piece of embodiment 1 of the present invention.

FIGS. 1-8 show a first embodiment of a file wrapper for wrapping according to the present invention, FIG. 1 is a development thereof, FIG. 2 is a surface view of the file wrapper for wrapping made from this development, FIG. 3 is a back view thereof, FIGS. 4 and 5 are surface view and back view of the file wrapper for wrapping showing wrapped state of commodities or the like, FIG. 6 is an enlarged sectional view showing the state of cathing together and sealing commodities or the like by a stopper and connecting piece, FIG. 7 is an explanatory view showing the state of latching together commodities or the like by a stopper, and FIG. 8 is an explanatory view showing the state of sealing commodities or the like by a connecting piece.

As shown in FIG. 1, a file wrapper 1 for wrapping according to the present invention is formed by die-cutting the paper materials (recyclable paper materials) that does not adversely affect environment, for example, kraft paper, by the press, under the condition of developing the file wrapper 1 for wrapping shown in FIGS. 2 and 3.

The die cut body 2 is provided with a covering paper 10 and a backing paper 11 of file wrapper 1 for wrapping shown in FIGS. 2 and 3, and opening portions 23 for inserting the commodities 31, of the covering paper 10 and the backing paper 11 are provided with sealing pieces 3 and 4 at respective papers.

The sealing piece 3 is provided with the stopper 5 for performing a positioning of commodities 31 inserted in the file wrapper 1 for wrapping, and formed by the cutting 6, and the sealing piece 4 is provided with the connecting piece 8 for engaging the notch hole 7 caused by the cutting 6 of the positioning stopper 5, and formed by the cutting 9.

The stopper 5 of one sealing piece 3 is formed in sectoral shape, and the connecting piece 8 of the other sealing piece 4 is formed in longitudinal shape.

Moreover, particularly, the connecting piece 8 is formed in such a manner so as to engage into the notch hole 7 caused when the commodities 31 inserted in the file wrapper 1 for wrapping is positioned by interfolding the stopper 5 internally, and thus the width L1 of the connecting piece 8 is made shorter than the length 11 in the base of the notch hole 7 slightly, and the length L2 of the connecting piece 8 is made longer than the length 12 of the stopper 5, so that when the connecting piece 8 is engaged in the notch hole 7 of the stopper 5, a long side portion 8a of the long connecting piece 8 projects from the notch hole 7, and is locked thereto. In this manner, sealing pieces 3 and 4 are connected by lengthening the length of the connecting piece, and the opening portion 23 can be sealed while positioning commodities 31 inserted in the file wrapper 1 for wrapping by sealing pieces 3 and 4 with the stopper 5.

In addition, sticking pieces 12 and 13 of backing paper 11 are provided at the sides of the covering paper 10. The sealing piece 4 is provided with a recess portion 14a at the central portion thereof, and is provided with tapers 14b at right and left sides thereof.

In the die cutting step of the die cutting body 2, cuttings 6 and 9 for forming the stopper 5 and the connecting piece 8 can be engraved at the same time.

Then, after the backing paper 11 is folded back and piled upon from the return line 15 of the diecutting body 2 to the covering paper 10, sticking pieces 12 and 13 on both sides of covering paper 10 are folded back from the return line 16, these sticking pieces are stuck to the backing paper 11, thereby fabricating the file wrapper 1 for wrapping. (Refer to FIGS. 2 and 3).

Therefore, when file wrapper 1 for wrapping that consists of the above-mentioned constitution, is used, the commodity 31 is inserted in the file wrapper 1 for wrapping from the opening portion 23 of the file wrapper 1 for wrapping. In this case, the insertion from the opening portion 23 of commodities 31 is performed by opening the sealing pieces 3 and 4 and by inserting the commodities therein, and as for the opening operation, the opening can easily be performed by opening sealing pieces 3 and 4 through the recess portion 14a.

Thereafter, the commodities 31 inserted in the file wrapper 1 for wrapping are locked by insinuating the stopper 5 along the periphery on the side of the opening portion 23 for commodities 31 and by interfolding the stopper 5 inside, while positioning the commodities. (Refer to FIGS. 4 and 7).

In addition thereto, the connecting piece 8 of the sealing piece 4 is engaged while inserting the connection piece 8 in the notch hole 7 of the sealing piece 3 caused by interfolding the stopper 5 inside.

That is, as described above, width L1 and length L2 of the connecting piece 8 are determined in such a manner so as to engage into the connecting piece 8 the notch hole 7 caused when the commodities 31 inserted in the file wrapper 1 for wrapping is positioned by interfolding the stopper 5 inside. Therefore, the width L1 of the connecting piece 8 is made shorter than the length 11 in the base of the notch hole 7 slightly, and the length L2 of the connecting piece 8 is made longer than the length 12 of the stopper 5, and thus the long side portion 8a of the long connecting piece 8 projects from the notch hole 7, and is locked thereto, when the connecting piece 8 is engaged in the notch hole 7 of the stopper 5. Sealing pieces 3 and 4 are connected by lengthening the length of the connecting piece, and the opening portion 23 can be sealed while positioning commodities 31 inserted in the file wrapper 1 for wrapping by sealing pieces 3 and 4 with the stopper 5.

Therefore, commodities 31 inserted in file wrapper 1 for wrapping can be fixed, by the positioning of commodities 31 in file wrapper 1 for wrapping according to stopper 5 of sealing piece 3 and the engagement of notch hole 7 of connecting piece 8, and opening portion 23 of the file wrapper 1 for wrapping can be sealed while connecting the sealing pieces 3 and 4 by the stopper 5 and the connecting piece 8. (See FIGS. 4-8).

As a result, commodities 31 wrapped in the file wrapper 1 for wrapping can be completely prevented from being positionally-deviated by the vibration in the bagging work process of commodities 31, or from being dashed out from the file wrapper 1 for wrapping.

Moreover, the encumbrance of recycling in the case of the conventional method of sealing opening portion 23 of file wrapper 1 for wrapping by using the pressure sensitive adhesive double coated tape, can be solved.

Moreover, in the case of engaging the connecting piece 8 to the notch hole 7, the long side portion 8a of the connecting piece 8 can be engaged to the notch hole 7, so that it should pay attention so as not to bend the long side portion 8a when inserting it in the notch hole 7 of the connecting piece 8.

Also, FIG. 7 shows the state of locking and positioning the commodities 31, under the condition of removing the backing paper 11 of the file wrapper 1 for wrapping. Moreover, in the above-mentioned description, as commodities 31, commodity, for example, film shaped and plate shaped photograph and file, picture postcard, and band-aid, or commodities such as stationeries and laminated teaching materials and, advertising fly sheet or pamphlets, furthermore, sample or food for service, for example, tea, chocolate, chewing gum, and the other laminated foods, are shown. As to following respective embodiments, the commodities are similar to the above described embodiment.

Second Embodiment

Figure 9:
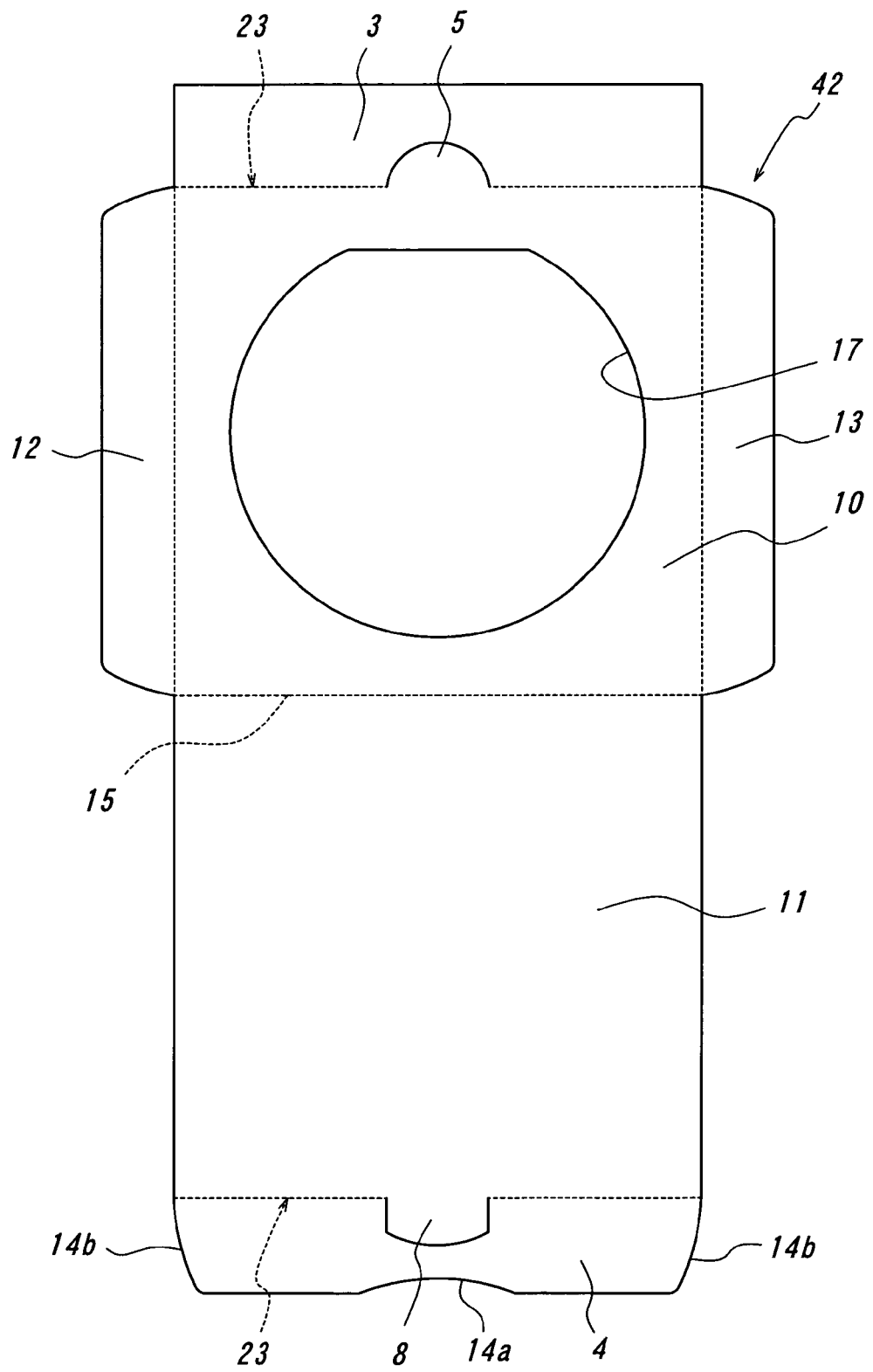
FIG. 9 is a development view of a file wrapper for wrapping showing an embodiment 2 according to the present invention.
Figure 10:
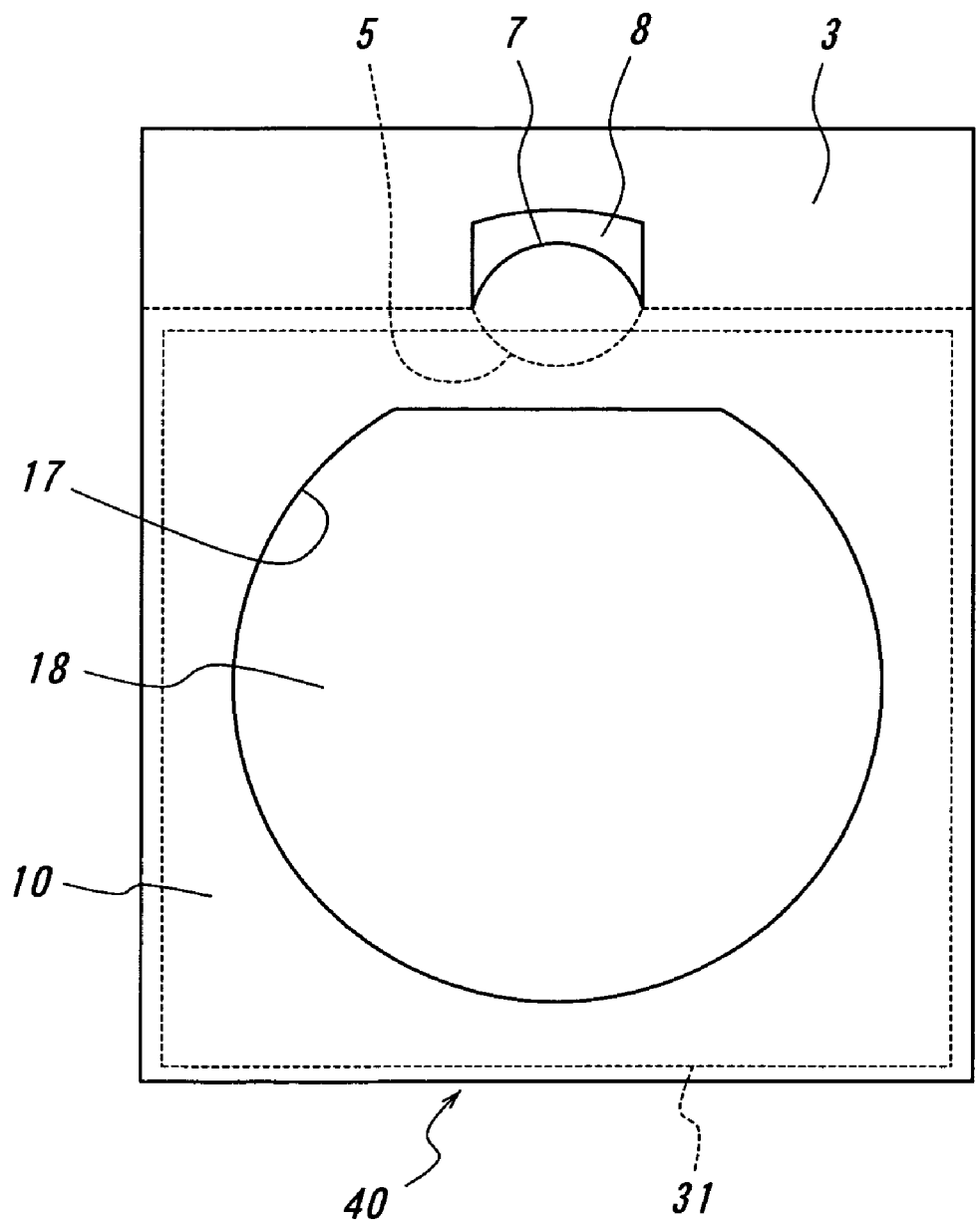
FIG. 10 is a surface view of file wrapper for wrapping showing state to wrap commodity etc. showing embodiment 2 of present invention.
Figure 11:
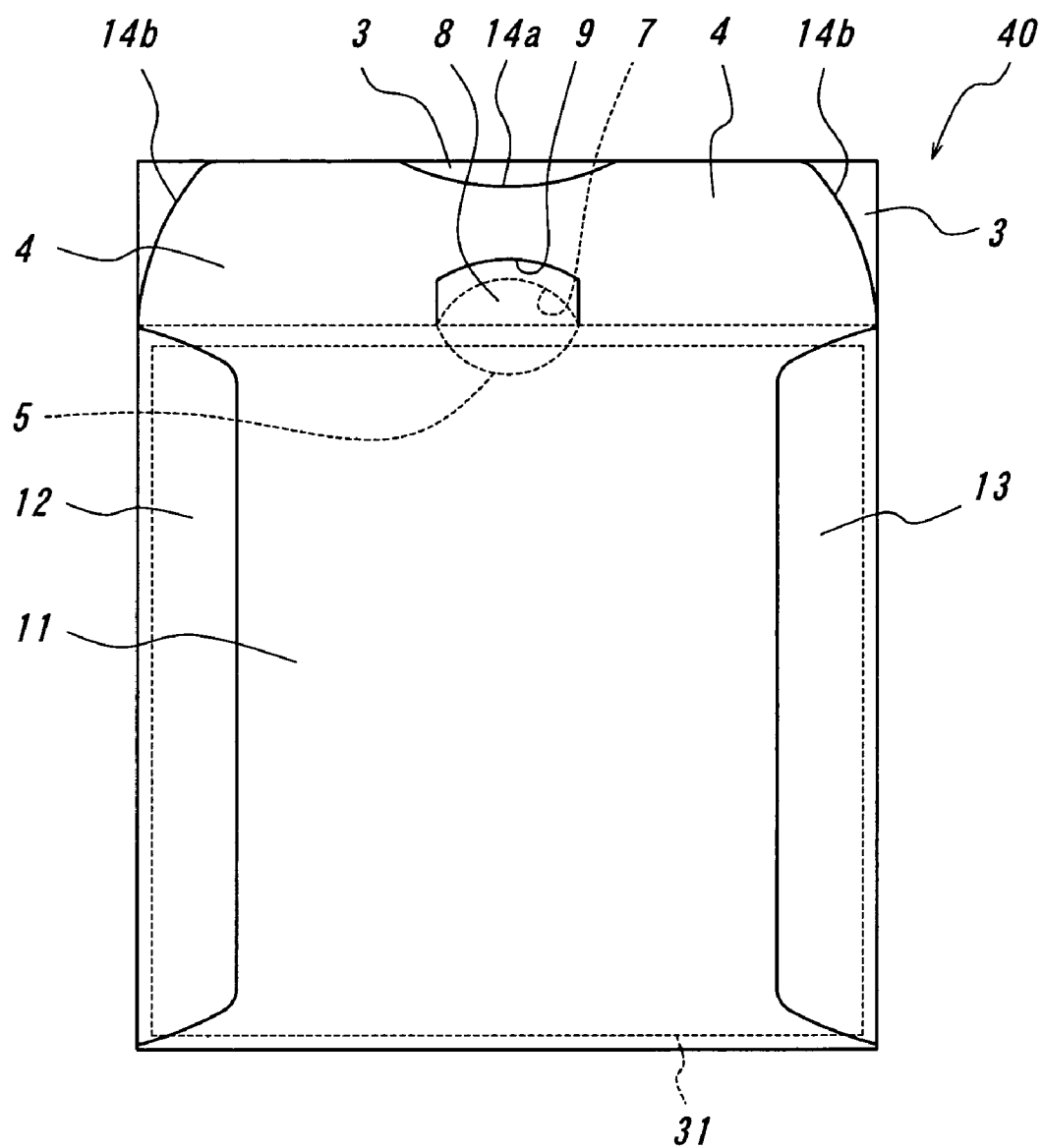
FIG. 11 is a back side back view of the file wrapper for wrapping showing state to wrap commodity etc. showing embodiment 2 of present invention.

FIGS. 9-11 shows a second embodiment of a file wrapper for wrapping according to the present invention, FIG. 9 is a development view of the file wrapper for wrapping, and FIGS. 10 and 11 are a surface view and a back view of the file wrapper for wrapping showing wrapped state of commodities.

The embodiment of a file wrapper 40 for wrapping shown in FIGS. 9-11 is an embodiment of the case which is so constructed that commodities 31 inserted in the file wrapper 40 for wrapping can be seen through, particularly, for the covering paper 10, in the file wrapper 1 for wrapping according to the embodiment 1.

In addition, the covering paper 10 is provided with an opening of a circular window 17 for seeing through the inserted commodities 31, and the constitution of pasting a glassine film 18 to the opening, is shown. (Refer to FIG. 10).

Therefore, in case of forming the circular window 17, the circular window 17 can be formed simultaneously with the dies cutting of a diecutting body 42 (See FIG. 9).

The pasting of a glassine film 18 to a circular window 17 is performed in relation to the fabricating work of the file wrapper 1 for wrapping shown in FIG. 10. The pasting glue being used utilizes a material that does not influence harmfully for recycling.

The fabricating step of the die cut body 42 shown in FIG. 9 and the fabricating step of the file wrapper 40 for wrapping are similar to those of first embodiment 1, and the insertion of commodities 31 in FIGS. 10 and 11 as well as the wrapping method and the sealing method depend on the method similar to the first embodiment 1, too, so that the detailed description thereof is omitted.

Moreover, in the constitution of the file wrapper for wrapping shown in FIGS. 9-11, the same numeral is attached to the same component as that of the file wrapper for wrapping shown in the first embodiment, so that the detailed description thereof is omitted.

Third Embodiment

Figure 12:
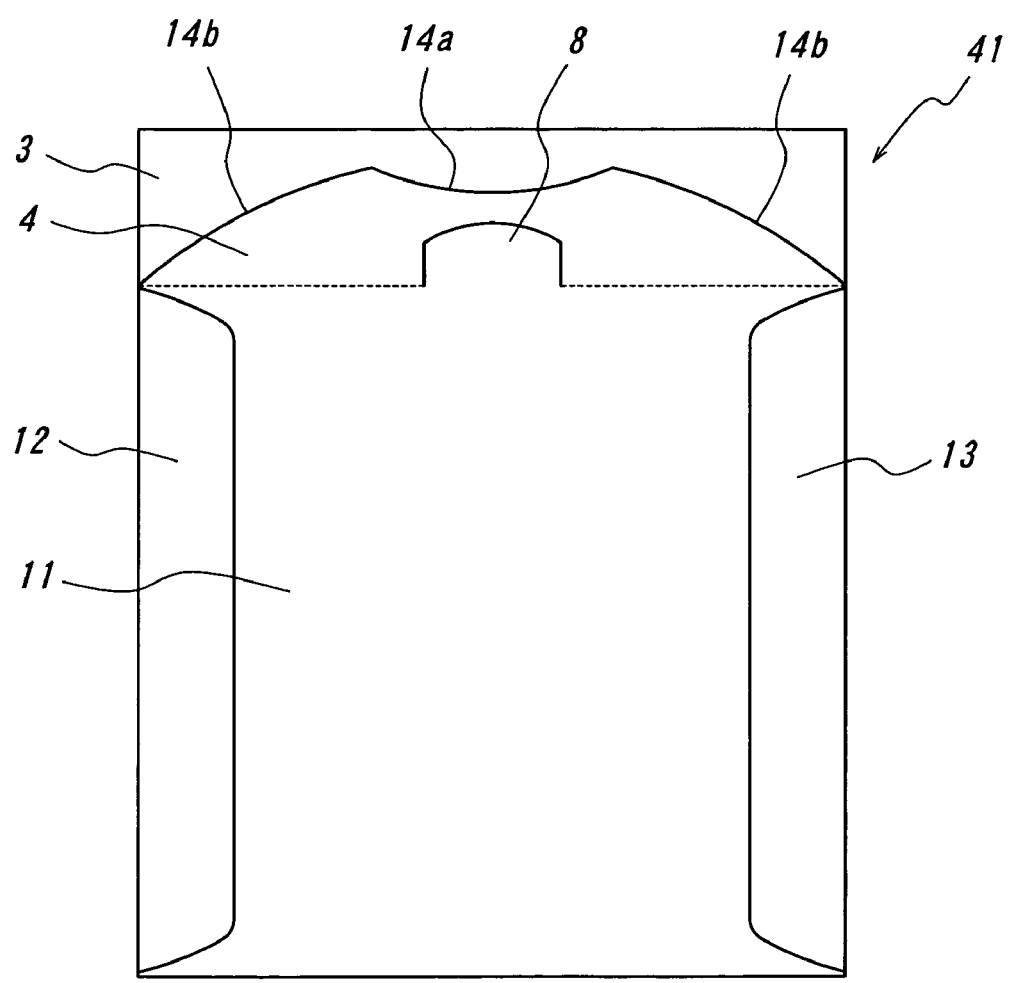
FIG. 12 is a development view of a file wrapper for wrapping showing an embodiment 3 according to the present invention.

FIG. 12 shows a third embodiments 3 of the present invention, and is a back side back view of the file wrapper for wrapping.

In the embodiment of the file wrapper 41 for wrapping shown in FIG. 12, among the shapes of the sealing piece 4 formed to the backing paper 11 of the file wrapper 41 for wrapping, in cases of the above embodiments 1 and 2, the length of the sealing piece 4 is made substantially identical to the length of the sealing piece 3 formed to the covering paper 10, but in the case of present embodiment, the length of the sealing piece 4 is made shorter than the length of the sealing piece 3.

By this constitution, in the case of inserting the commodities 31 in the file wrapper 41 for wrapping, the opening operations of the sealing pieces 3 and 4 can easily be accomplished by the recess portion 14a provided in the central region of the sealing piece 4, or the operation of the pushing open work between the sealing pieces 3 and 4 due to the taper 14b can easily be accomplished by the sealing piece 4 that is shorter than the one sealing piece 3.

According to the constitution of the file wrapper for wrapping according to this embodiment, the same function and effect as the precedent can be obtained by shortening the length of either one sealing piece of the sealing pieces 3 and 4, and this case is not limited to the embodiment of FIG. 12.

Moreover, other constitutions of file wrapper 41 for wrapping, can be performed by the same constitution as the constitution of the embodiment 1, so that its description with reference to the drawing is omitted.

The method of fixing commodities 31 and the method of sealing with the stopper 5 of the sealing pieces 3 and 4 and the connecting piece 8, are similar to the precedent, so that the description thereof is also omitted.

Fourth Embodiment

Figure 13A:
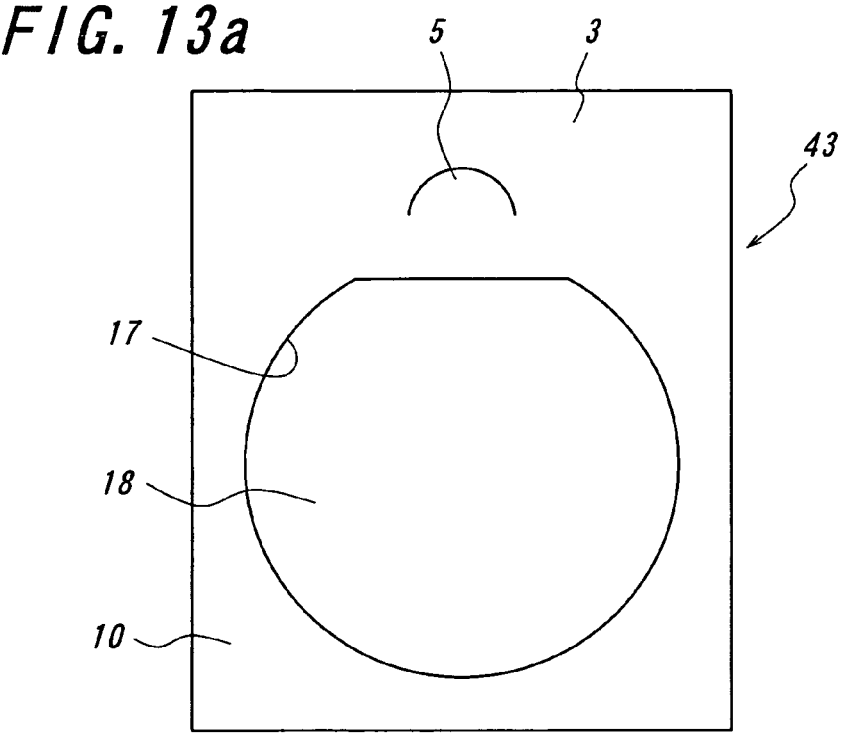
FIG. 13a is a surface view of a file wrapper for wrapping showing an embodiment 4 according to the present invention.
Figure 13B:
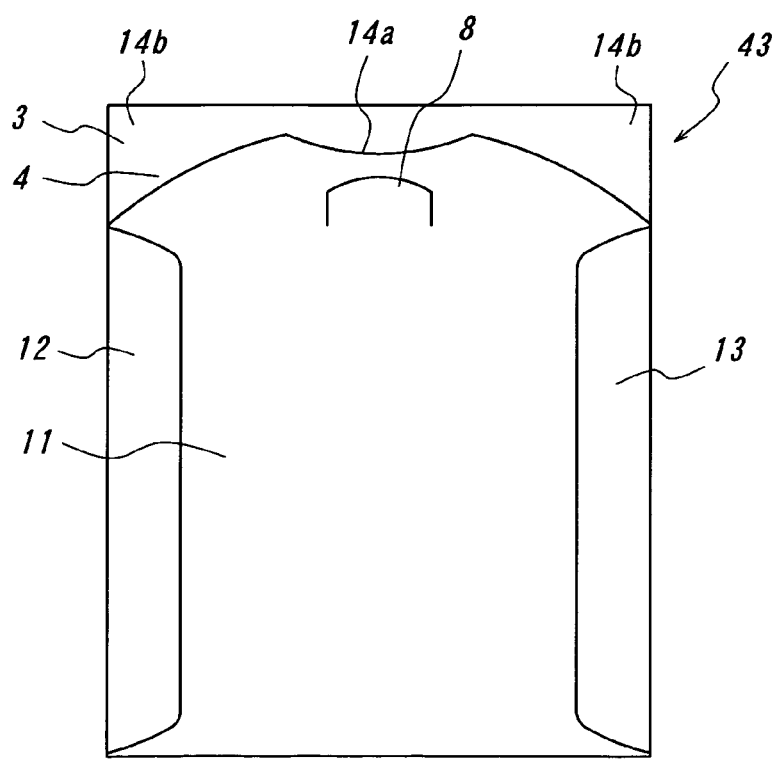
FIG. 13b is a back side back view of a file wrapper for wrapping showing an embodiment 4 according to the present invention.

FIGS. 13a and 13b show a fourth embodiment 4 according to the present invention, FIG. 13a is a surface view of the file wrapper for wrapping and FIG. 13b is a back side back view thereof.

In the embodiment of the file wrapper 43 for wrapping shown in FIGS. 13a and 13b, among the shapes of the sealing piece 4 formed to the backing paper 11 of the file wrapper 43 for wrapping, in cases of the above embodiments 1 and 2, the length of the sealing piece 4 is made substantially identical to the length of the sealing piece 3 formed to the covering paper 10, and in the case of present embodiment, the length of the sealing piece 4 is made shorter than the length of the sealing piece 3. Moreover, the covering paper 10 of the file wrapper 43 for wrapping is provided with a see-through window 17 for commodities (round window).

By this constitution, in the case of inserting the commodities 31 in the file wrapper 43 for wrapping, the opening operations of the sealing pieces 3 and 4 can easily be accomplished by the recess portion 14a provided in the central region of the sealing piece 4, or the operation of the pushing open work between the sealing pieces 3 and 4 due to the taper 14b can easily be accomplished by the sealing piece 4 that is shorter than the one sealing piece 3.

According to the constitution of the file wrapper for wrapping according to this embodiment, the same function and effect as the precedent can be obtained by shortening the length of either one sealing piece of the sealing pieces 3 and 4, so that this case is not limited to the embodiment of FIG. 13.

Moreover, other constitutions of file wrapper 43 for wrapping, can be performed by the same constitution as the constitution of the embodiment 1, so that its description with reference to the drawing is omitted.

Method of fixing commodities 31 and the sealing method according to the stopper 5 of the sealing pieces 3 and 4 and the connecting piece 8, are similar to the precedent, so that the description thereof is also omitted.

Moreover, the constitution in the see-through window 17 (round window) can be formed with the constitution similar to the second embodiment 2.

Fifth Embodiment

Figure 14:
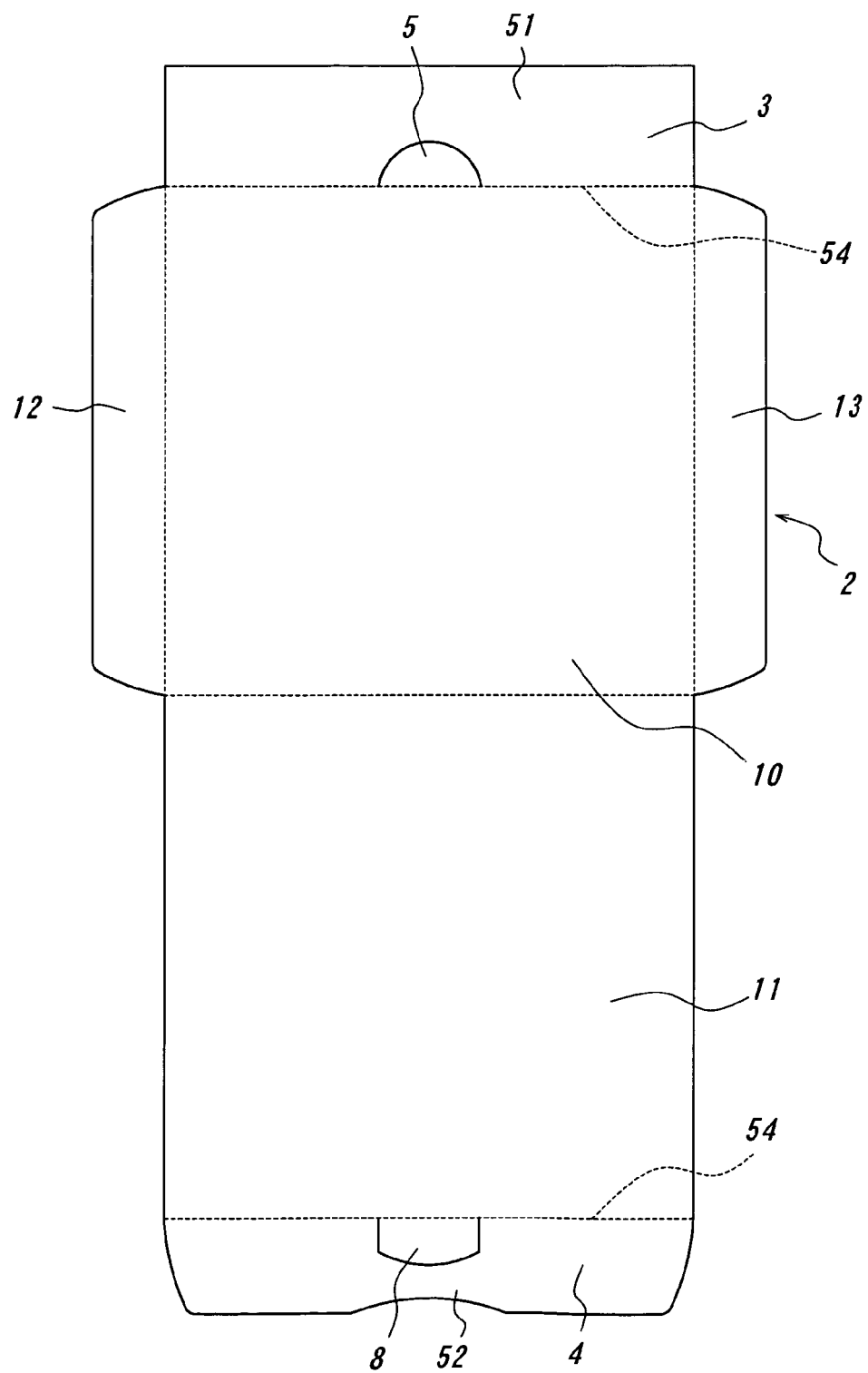
FIG. 14 is a development view of a file wrapper for wrapping showing an embodiment 5 according to the present invention.
Figure 15A:
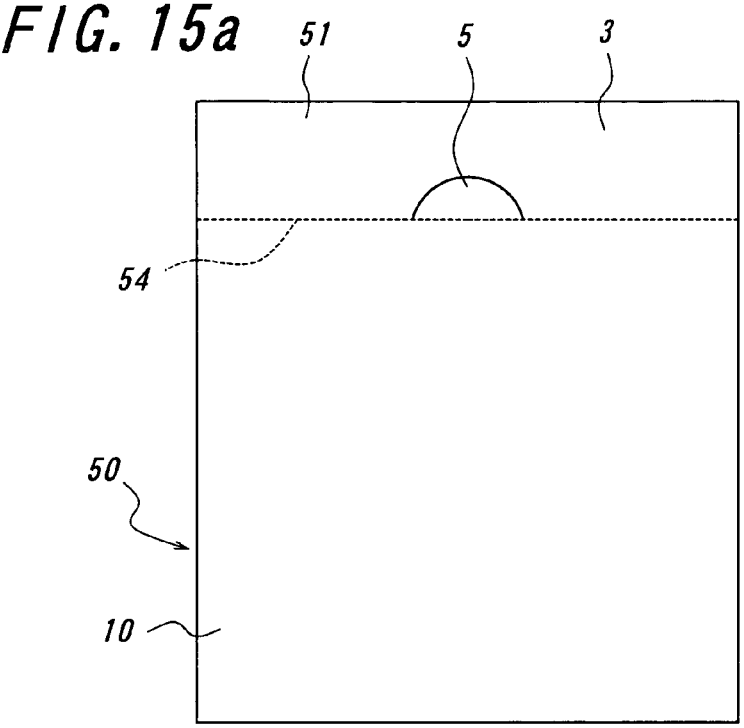
FIG. 15a is a surface view of a file wrapper for wrapping showing an embodiment 5 according to the present invention.
Figure 15B:
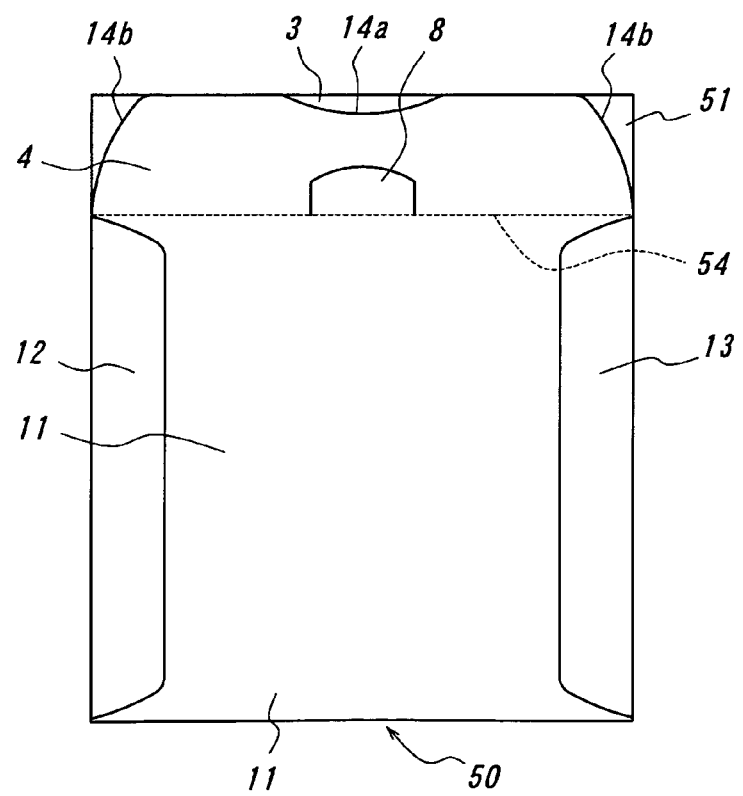
FIG. 15b is a back side back view of a file wrapper for wrapping showing the embodiment 5 according to the present invention.
Figure 16:
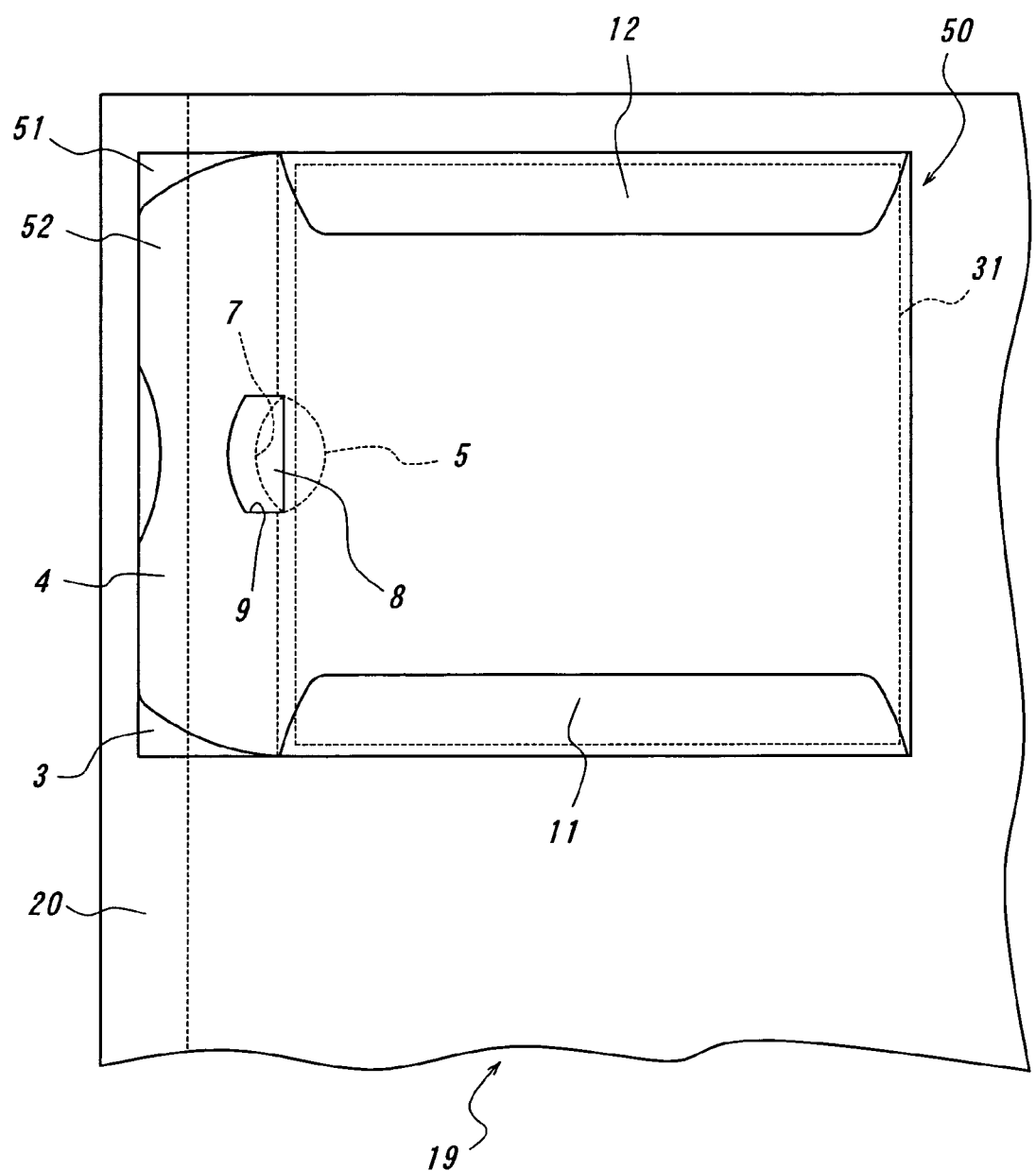
FIG. 16 is an explanatory view showing the state to file the file wrapper for wrapping in the magazine of the embodiment 5 according to the present invention.

FIGS. 14-16 show a fifth embodiment according to the present invention, FIG. 14 is a development view of a file wrapper for wrapping showing fifth embodiment according to the present invention, FIGS. 15a and 15b are a surface view and a back side back view of the file wrapper for wrapping, and FIG. 16 is an explanatory view showing the state to bind the file wrapper for wrapping in a magazine.

In the case of a file wrapper 50 for wrapping shown in FIGS. 14-16, the embodiment of the file wrapper for wrapping in case of binding the file wrapper for wrapping shown in first to third embodiments to the necessary page of the magazine, is shown.

In FIGS. 14-16, particularly, bound-in width portions 51 and 52 are provided to the sealing pieces 3 and 4, by making a length of the sealing pieces 3 and 4 slightly longer (for example, lengthened by 1 cm), compared with a usual file wrapper 1 for wrapping of first to third embodiments.

Moreover, the method of fabricating the file wrapper 50 for wrapping shown in FIG. 14 is identical, so that the same numeral is affixed to the same constitution, the explanation thereof is omitted, and the description of the production method thereof is also omitted.

In addition, in the case of this embodiment 5, a perforated line 54 for cutting out is provided so as to easily perform separation between main body of the file wrapper 50 for wrapping and the sealing pieces 3 and 4, thereby fabricating the file wrapper for wrapping.

When the file wrapper 50 for wrapping that consists of the above-mentioned constitution, is used, commodities 31 are inserted in the file wrapper 50 for wrapping, while clipping and holding a CD 31 (commodity) with the thumb and the forefinger, and inserting between bound-in widths 3 and 4.

Thereafter, the thumb is pulled out from the file wrapper 50 for wrapping, the stopper 5 along the fringe of commodities 31 inserted in the file wrapper 50 for wrapping is folded back with the use of the forefinger in file wrapper 50 for wrapping, while pushing the stopper 5 by the thumb inside, thereby locking and positioning the commodities 31 by the stopper 5.

In the case of interfiling the file wrapper for the wrapping to the required page of the magazine, as shown in FIG. 16, bound-in width portions 51 and 52 of the file wrapper 50 for wrapping are inserted in the filing portion 20 on the filing page of the magazine 19, bound-in width portions 51 and 52 are interfiled at the same time as an interfiling work of the filing portion 20 of the magazine 19, so that the commodities can be interfiled in the magazine 19, under the condition that commodities 31 inserted by the bound-in width portions 51 and 52 in file wrapper 50 for wrapping was sealed.

Therefore, the commodities can be interfiled in the magazine 31, without needing work of sealing stickers to seal commodities 31 inserted in file wrapper 1 for wrapping and the pasting seal, workability and the economical efficiency are simplified, and decreased, and the impact on to the environment can be decreased.

In addition, in case of inserting the commodities between bound-in width portions 51 and 52, the pushing open work in case of inserting the commodities 31 can be smoothly performed, by forming one bound-in width portion 51 short, and thus the inserting work of the commodities 31 can be facilitated.

Moreover, in this case, pushing open work between the bound-in width portions 51 and 52 can be facilitated through the cutting recess portion 14a or the taper 14b.

The commodities 31 can be positioned in the file wrapper 50 for wrapping by interfolding and fixing the stopper 5 while locking the commodities 31, and it can be prevented from being moved to the bound-in width portions 51 and 52, by shifting commodities 31 inserted in the file wrapper 50 for wrapping, in case of interfiling the bound-in width portions 51 and 52 in the filing portion 20 of the magazine 19 by the connection of the connecting piece 8.

In addition, in case of taking out the commodities 31 of file wrapper 50 for wrapping interfiled in the magazine 19, the commodities 31 can be taken out simply, by separating the side of file wrapper 50 for wrapping from the filing portion 20 through the perforated line 54.

Sixth Embodiment

Figure 17:
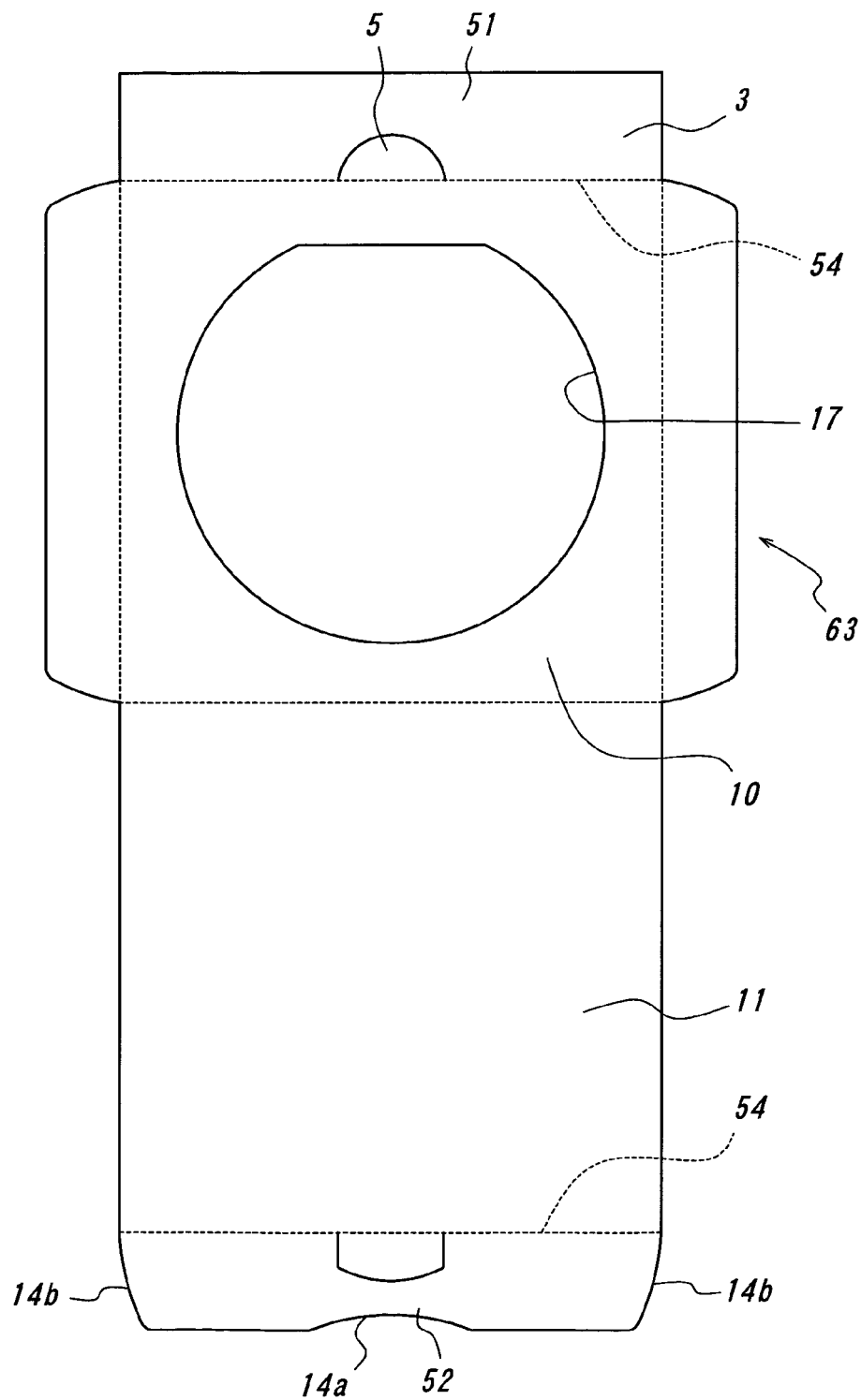
FIG. 17 is a development view of a file wrapper for wrapping showing an embodiment 6 according to the present invention.
Figure 18:
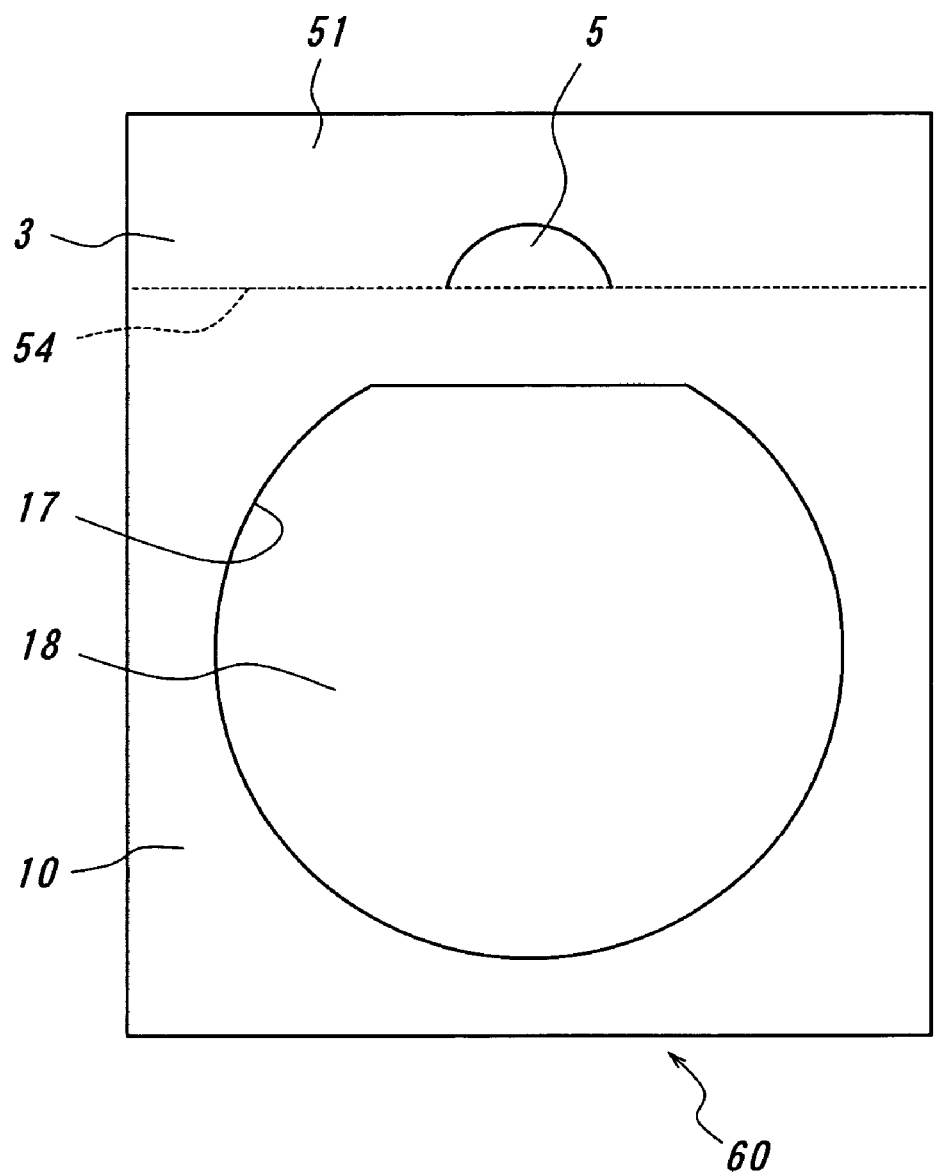
FIG. 18 is a surface view of the file wrapper for wrapping showing the embodiment 6 according to the present invention.
Figure 19:
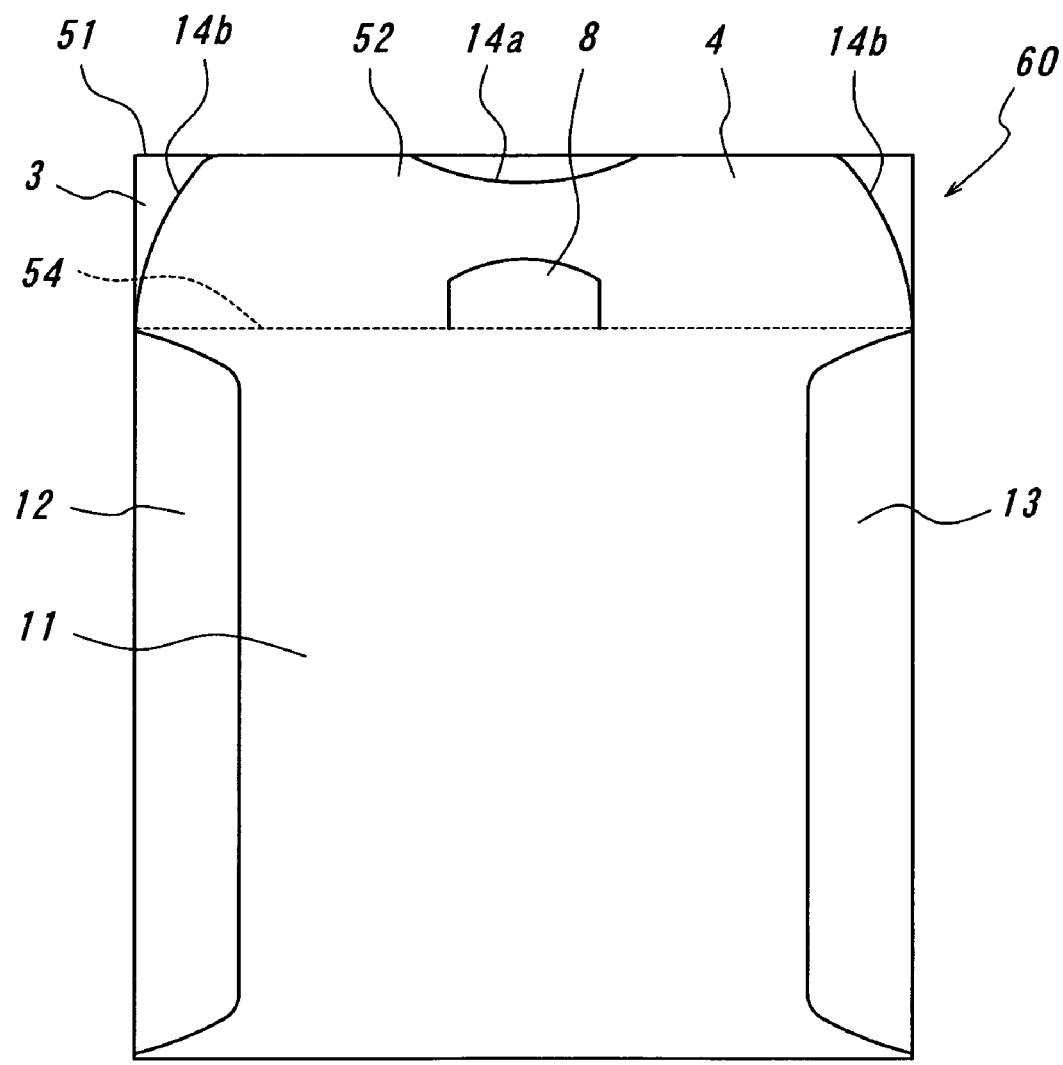
FIG. 19 is a back side back view of the file wrapper for wrapping showing the embodiment 6 according to the present invention.

FIGS. 17-19 show a sixth embodiment according to the present invention, FIG. 17 is a development of the file wrapper for wrapping, FIG. 18 is a surface view of the file wrapper for wrapping, and FIG. 19 is a back side back view thereof.

The present embodiment 6 is an embodiment of the case that the see-through window 17 (circular window) where commodities 31 inserted in the file wrapper 60 for wrapping is seen through, is provided to the covering paper 10 of the file wrapper 50 for wrapping in the fifth embodiment 5, other constitutions are identical with those of the fifth embodiment 5, the same parts are affixed to the same numeral, and the description thereof is omitted, and then, method of fabricating the file wrapper 60 for wrapping due to the die cut body 63, and, method of fixing commodities 31, furthermore, filing method for the filing portion 20 of the magazine 19 is similar to that of the embodiment 5, so that its detailed description with reference to the drawing is omitted.

Moreover, as to the file wrappers 50 and 60 for wrapping in fifth and sixth embodiments 5 and 6, also, naturally, the implement due to the file wrapper for wrapping under the state of comprising constitutions of the third and fourth embodiments 3 and 4 is also possible, but its concrete description with reference to the drawing is omitted.

That is, in the lengths of sealing pieces 3 and 4 in the file wrappers 50 and 60 for wrapping, respectively, the length of one sealing piece is made shorter than the length of the other sealing piece, slightly, so that the pushing open operation between sealing pieces 3 and 4 in case of inserting a CD31 can be facilitated.

Moreover, in the above described embodiments 1-6, the method of sealing the commodities by inserting them in the file wrapper for wrapping explained the case that the inserted commodities are sealed while locking them by the stopper. However, the file wrapper for wrapping can be used by only sealing them without locking with the stopper, in connection with the work efficiency, or in the case within the range allowed in connection with the contents of the inserted commodities.

Figure 20:
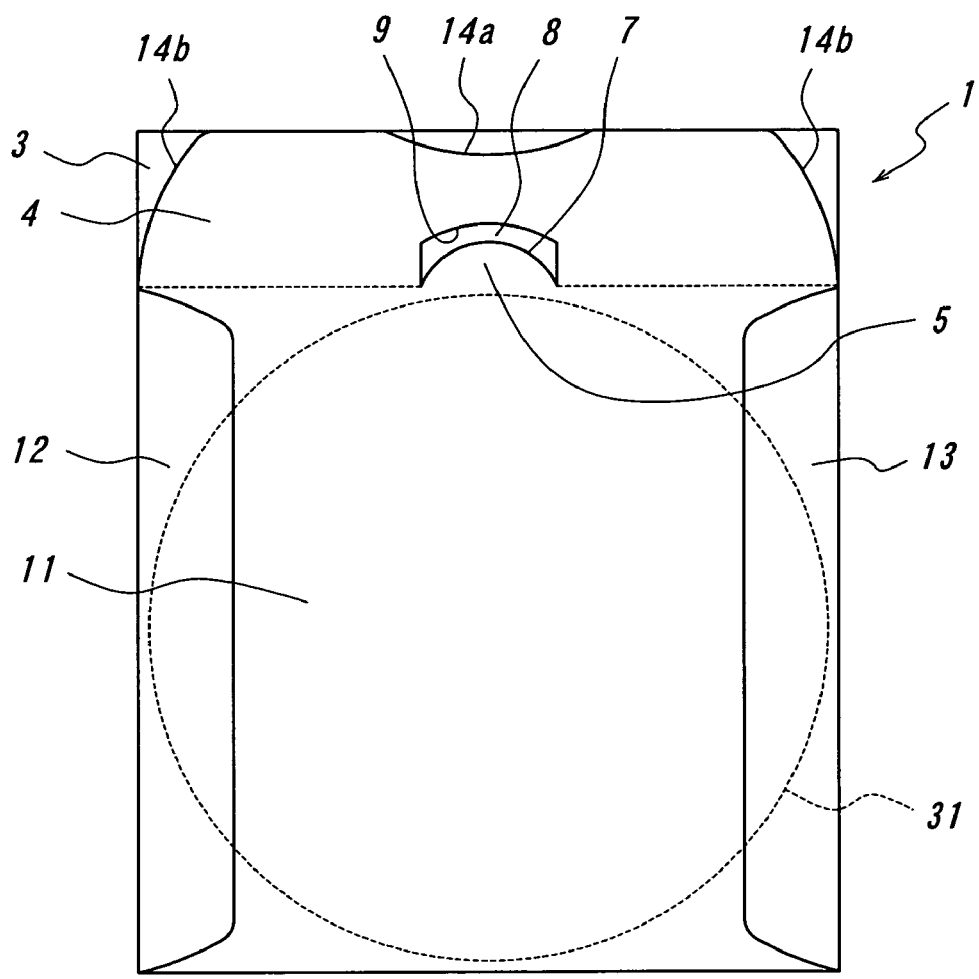
FIG. 20 is a back side back view showing method of sealing file wrapper for wrapping other than the method thereof in embodiments 1-6 according to the present invention.
Figure 21:
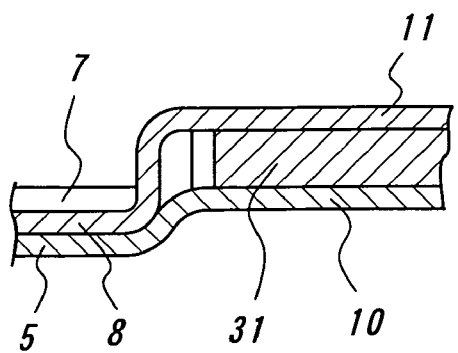
FIG. 21 is an enlarged sectional view showing the state of sealing the file wrapper for wrapping according to the present invention.
Figure 22:
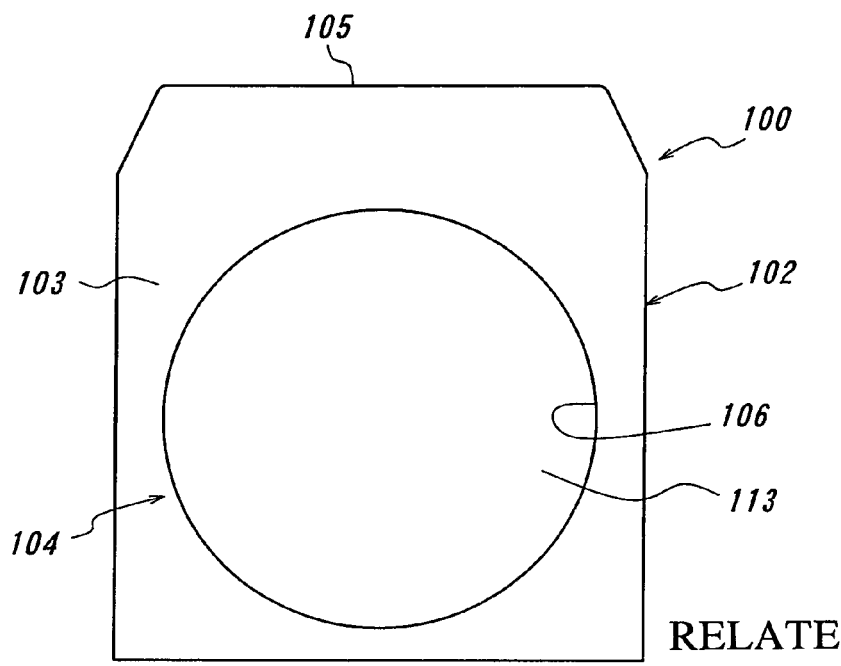
FIG. 22 is a surface view showing a conventional CD casing.
Figure 23:
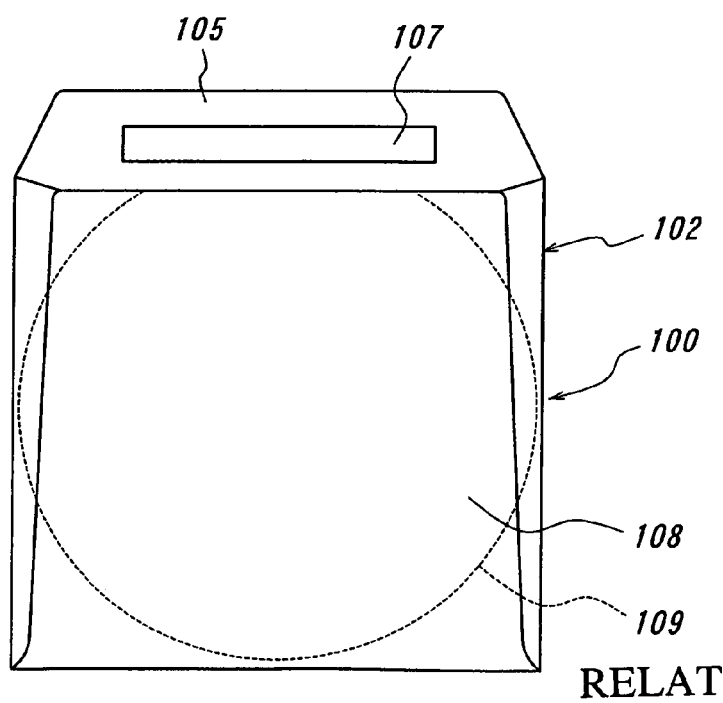
FIG. 23 is a back side back view showing the conventional CD casing.
Figure 24:
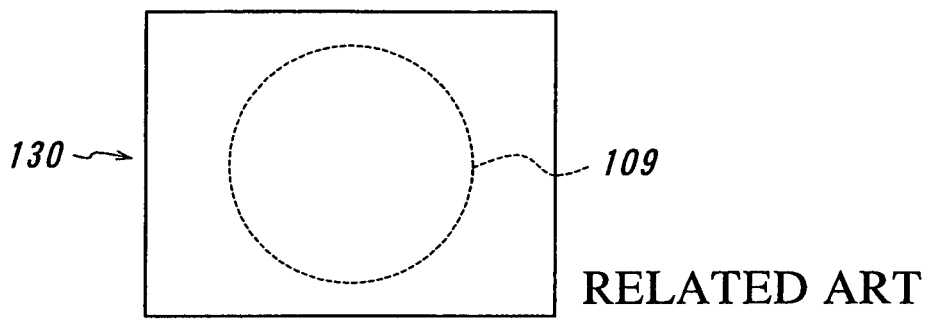
FIG. 24 is a surface view showing a conventional bound-in CD casing.
Figure 25:
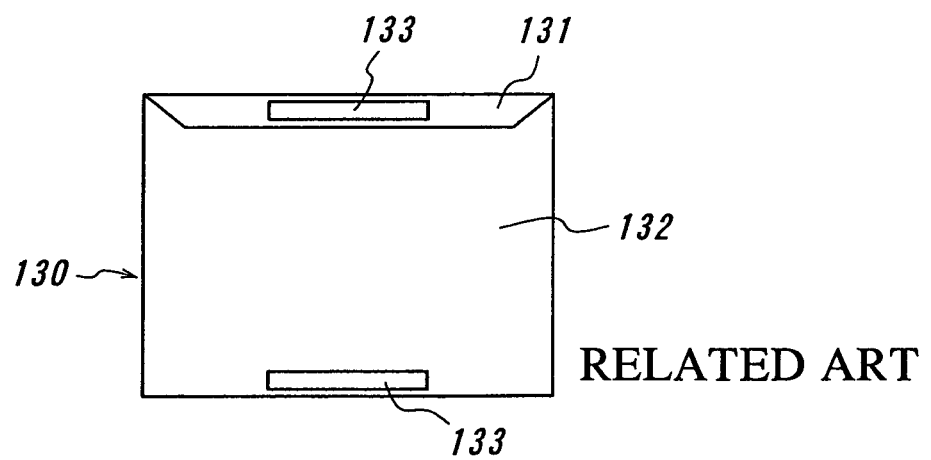
FIG. 25 is a back side back view showing the conventional bound-in CD casing.
Figure 26:
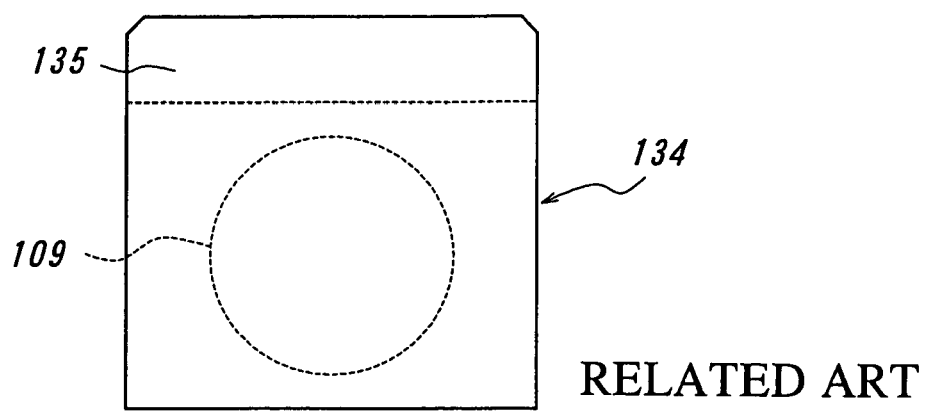
FIG. 26 is a surface view showing a conventional bound-in CD casing.
Figure 27:
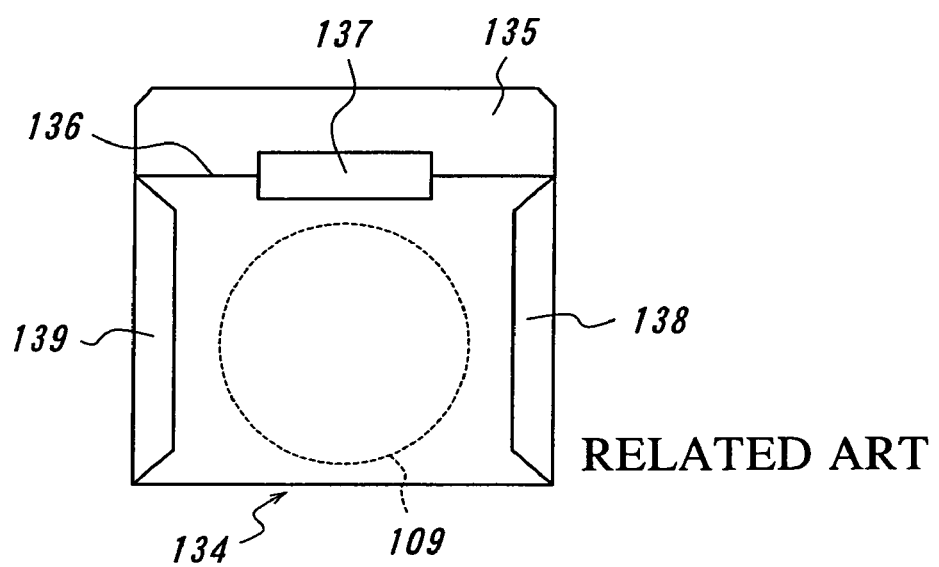
FIG. 27 is a back side back view showing the conventional bound-in CD casing.
Figure 28:
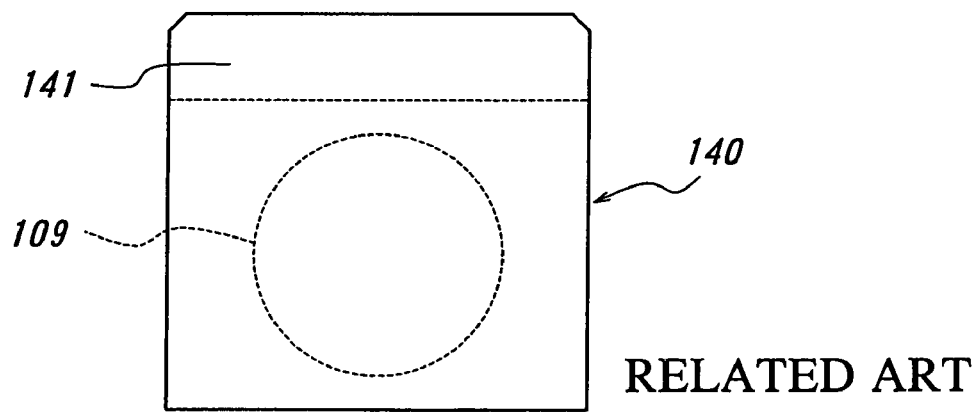
FIG. 28 is a surface view showing a conventional bound-in CD casing.
Figure 29:
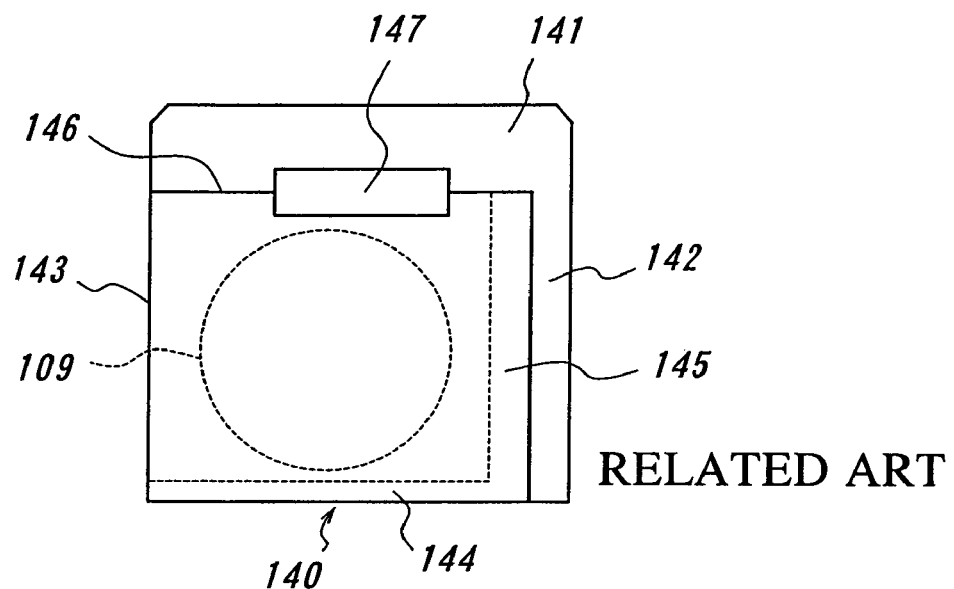
FIG. 29 is a back side back view showing the conventional bound-in CD casing.
Figure 30:
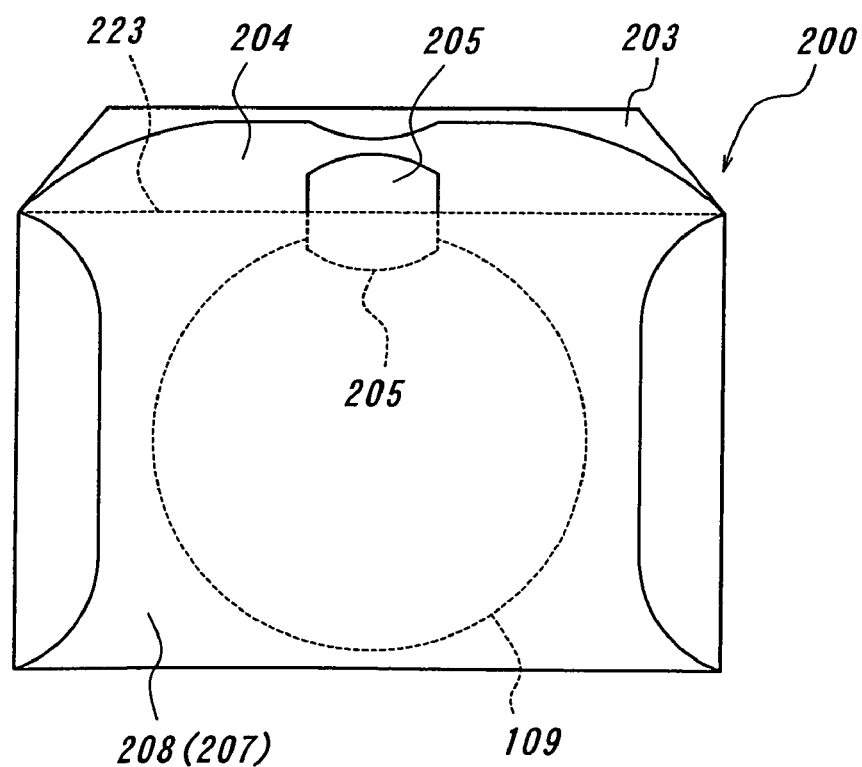
FIG. 30 is a back side back view showing a bound-in CD casing in the senior application of the present invention.

That is, in the file wrapper consisting of the constitutions shown in embodiments 1-6, the embodiment in case of using the file wrapper for wrapping, while sealing it simply, is explained with reference to FIGS. 20 and 21. FIGS. 20 and 21 disclose the case of the file wrapper 1 for wrapping in the embodiment 1, and after inserting the commodity 31 in the file wrapper 1 for wrapping, the stopper 5 is interfolded along the commodity 31, thereby omitting the latching work. And then, the connecting piece 8 is inserted in the notch hole 7, and is sealed therein.

As is clear from FIG. 21, in case of using the simple sealing method, the work efficiency can be improved by omitting the latching work according to stopper 5. For example, the sealing work can be completed by the one-touch of only the operation to push the connecting piece 8 into the notch hole 7 with the finger. However, the latching by the stopper 5 is not performed, so that as is clear also in FIG. 21, the play in the order of about 2-3 mm is caused between the commodities 31 or the like and the opening portion. However, the commodity 31 is dashed out because of the play besides file wrapper 1 for wrapping, this overflow can be obstructed by the engagement to the notch hole 7 of the connecting piece 8.

Therefore, as described above, when the wrapping condition of the commodity or the like 31 is within tolerance, in the file wrapper for wrapping shown in embodiments 1-6, of course, the implement according to the sealing method shown in FIGS. 20 and 21 becomes possible, too.

What is claimed is:

1. A file wrapper comprising: a die cut body, which comprises a unit piece of integral constitution that is bent to form a bag shaped package having an opening for inserting commodities, the unit piece comprised of a covering paper having side portions, a first opening portion and a fourth portion opposing the opening portion;

a backing paper adjacent to the covering paper and connected to the covering paper along the fourth portion of the covering paper, the backing paper having a second opening portion;

a sealing pieces provided at the opening of the bag shape shaped package on each of the first opening portion of the covering paper and the second opening portion of the backing paper; and side sticking pieces provided to both of the side portions of the covering paper, wherein the sealing piece provided on the opening portion of the backing paper is on an opposing side of the backing paper with respect to a return line formed where the backing paper connects to the fourth portion of the covering paper, the sealing pieces abut each other when the covering paper and backing paper are overlapped upon bending along the return line between the backing paper and the covering paper, the sealing piece of one of the first or the second opening portion is provided with a first notch hole starting from and connected to the one of the first or the second opening portion and surrounded by the one of the first or the second opening portion and the sealing piece of the one of the first or the second opening portion by notching a part of the sealing piece of the one of the first or second opening portion, thereby forming, in the shape of a sector of a circle, a stopper of commodities, and the other sealing piece of the other of the first or second opening portion is provided with a second notch hole starting from and connected to the other of the first or second opening portion and surrounded by the other of the first or the second opening portion and the sealing piece of the other of the first or the second opening portion by notching a part of the sealing piece of the other of the first or second opening portion, thereby forming a rectangularly shaped connecting piece inserted in and engaged with the first notch hole; the connecting piece having an engaging portion with the first notch hole, a length greater than a width of the first notch hole, and a width less than a length of a base of the first notch hole, and a bound portion is provided to each of the sealing pieces of the covering paper and the backing paper, and a perforated line engraved in each of the sealing pieces to facilitate separation along the perforated lines, wherein a length of either the sealing piece of the covering paper or the backing paper is shorter than the length of the other sealing piece, and whereby commodities can be interfiled in a magazine, without need of sealing stickers to seal commodities inserted in the file wrapper.

* * * * *